US009822953B2

(12) United States Patent
Park

(10) Patent No.: US 9,822,953 B2
(45) Date of Patent: Nov. 21, 2017

(54) ILLUMINATION UNIT AND DISPLAY APPARATUS USING THE SAME

(71) Applicant: LG INNOTEK CO., LTD, Seoul (KR)

(72) Inventor: Sung Yong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 118 days.

(21) Appl. No.: 13/783,598

(22) Filed: Mar. 4, 2013

(65) Prior Publication Data

US 2013/0250549 A1   Sep. 26, 2013

(30) Foreign Application Priority Data

Mar. 23, 2012 (KR) ........................ 10-2012-0029783

(51) Int. Cl.
   *F21V 7/04* (2006.01)
   *F21V 19/00* (2006.01)
   (Continued)

(52) U.S. Cl.
   CPC ............... *F21V 19/00* (2013.01); *F21L 4/02* (2013.01); *F21S 2/00* (2013.01); *F21S 4/28* (2016.01);
   (Continued)

(58) Field of Classification Search
   CPC .. F21S 8/036; F21S 8/043; F21S 8/046; F21S 8/008; F21S 8/026; F21S 4/008;
   (Continued)

(56) References Cited

U.S. PATENT DOCUMENTS 2,436,635 A * 2/1948 Bishop, Jr. .................... 362/224
4,554,619 A * 11/1985 Bansbach ............ F21V 15/013
                                                       362/217.08
(Continued)

FOREIGN PATENT DOCUMENTS

GB          1453061 A  * 10/1976  ................ F21S 8/04
JP       2009-195273         9/2009
WO  WO 2011051925 A2 *  5/2011

OTHER PUBLICATIONS

European Search Report dated Oct. 1, 2014 issued in Application No. 13 159 118.2.
(Continued)

*Primary Examiner* — Bryon T Gyllstrom
*Assistant Examiner* — James Endo
(74) *Attorney, Agent, or Firm* — Ked & Associates, LLP

(57) ABSTRACT

A display apparatus including an illumination unit having a first illumination unit including a first light source module, a second illumination unit including a second light source module, and a bracket located between the first and second illumination units to connect the illumination units to each other. The bracket includes a first body portion on which the first light source module is placed, a second body portion on which the second light source module is placed, and a connecting portion located between the first and second body portions to connect the body portions to each other. The connecting portion has a first distance from a first end of the first or second body portion and a second distance from a second end of the first or second body portion, and the second distance is greater than the first distance.

20 Claims, 32 Drawing Sheets

(51) Int. Cl.
| | |
|---|---|
| *F21L 4/02* | (2006.01) |
| *F21V 7/00* | (2006.01) |
| *F21V 8/00* | (2006.01) |
| *F21S 8/02* | (2006.01) |
| *F21V 17/12* | (2006.01) |
| *F21S 4/28* | (2016.01) |
| *F21V 23/02* | (2006.01) |
| *F21S 8/04* | (2006.01) |
| *F21S 2/00* | (2016.01) |
| *F21S 8/00* | (2006.01) |
| *F21V 21/02* | (2006.01) |
| *F21V 21/04* | (2006.01) |
| *F21V 21/005* | (2006.01) |
| *F21V 23/00* | (2015.01) |
| *F21V 17/00* | (2006.01) |
| *F21Y 103/10* | (2016.01) |
| *F21Y 115/10* | (2016.01) |

(52) U.S. Cl.
CPC ............... *F21S 8/026* (2013.01); *F21V 7/00* (2013.01); *F21V 7/005* (2013.01); *F21V 7/0008* (2013.01); *F21V 17/12* (2013.01); *F21V 23/009* (2013.01); *G02B 6/009* (2013.01); *G02B 6/0018* (2013.01); *G02B 6/0073* (2013.01); *G02B 6/0078* (2013.01); *G02B 6/0091* (2013.01); *G02B 6/0096* (2013.01); *F21S 2/005* (2013.01); *F21S 8/036* (2013.01); *F21S 8/043* (2013.01); *F21S 8/046* (2013.01); *F21V 17/002* (2013.01); *F21V 21/005* (2013.01); *F21V 21/025* (2013.01); *F21V 21/04* (2013.01); *F21V 23/008* (2013.01); *F21V 23/023* (2013.01); *F21V 23/026* (2013.01); *F21Y 2103/10* (2016.08); *F21Y 2115/10* (2016.08)

(58) Field of Classification Search
CPC ........ F21S 2/00; F21S 4/28; F21S 8/02; F21S 2/005; F21L 4/02; F21V 23/009; F21V 7/005; F21V 7/0008; F21V 17/06; F21V 17/08; F21V 17/005; F21V 7/0025; F21V 7/0041; F21V 7/0033; F21V 7/08; F21V 23/02; F21V 23/023; F21V 23/008; F21V 21/025; F21V 21/04; F21V 17/002; F21V 21/005; F21V 25/12; F21V 23/026; G02B 6/0078

USPC .......... 362/147, 148, 150, 225, 219, 217.07, 362/217.06, 217.05, 310, 184, 247, 241, 362/243, 249.01, 97.1, 246, 616, 296.01, 362/300, 311.14, 235, 217.1, 217.14, 362/217.16, 217.17, 244; 248/220.21, 248/220.22, 225.11, 223.41
See application file for complete search history.

(56) References Cited

U.S. PATENT DOCUMENTS

| | | | | |
|---|---|---|---|---|
| 4,562,517 | A * | 12/1985 | Pankin | 362/147 |
| 4,876,633 | A | 10/1989 | Engel | |
| 4,933,820 | A | 6/1990 | Engel | 362/217 |
| 5,076,035 | A * | 12/1991 | Wright | 52/464 |
| D530,038 | S * | 10/2006 | Kotovsky | D26/76 |
| 7,559,672 | B1 * | 7/2009 | Parkyn et al. | 362/244 |
| 7,674,005 | B2 * | 3/2010 | Chung et al. | 362/223 |
| 7,914,170 | B2 * | 3/2011 | Engel | F21S 8/06 362/217.04 |
| 8,042,977 | B1 * | 10/2011 | Nourishad et al. | 362/343 |
| 8,057,061 | B2 * | 11/2011 | Otsuki et al. | 362/125 |
| 8,061,867 | B2 * | 11/2011 | Kim et al. | 362/217.17 |
| 8,220,955 | B2 * | 7/2012 | Kwak | F21K 9/00 362/217.05 |
| 2002/0003699 | A1 * | 1/2002 | Shemitz et al. | 362/225 |
| 2007/0171676 | A1 * | 7/2007 | Chang | 362/613 |
| 2008/0158858 | A1 | 7/2008 | Madireddi et al. | 362/92 |
| 2010/0067236 | A1 * | 3/2010 | Gassner | F21V 17/02 362/294 |
| 2010/0103672 | A1 * | 4/2010 | Thomas et al. | 362/235 |
| 2011/0000526 | A1 | 1/2011 | West | 136/251 |
| 2011/0058353 | A1 * | 3/2011 | Yang | 362/84 |
| 2011/0058357 | A1 * | 3/2011 | Anderson | 362/125 |
| 2011/0058358 | A1 * | 3/2011 | Soo et al. | 362/147 |
| 2011/0075416 | A1 * | 3/2011 | Chou et al. | 362/235 |
| 2011/0096544 | A1 * | 4/2011 | Nakamura | 362/235 |
| 2011/0211335 | A1 * | 9/2011 | Ko | 362/97.1 |
| 2011/0222267 | A1 | 9/2011 | Park et al. | |
| 2011/0280000 | A1 * | 11/2011 | Kwak | F21K 9/00 362/84 |
| 2012/0051050 | A1 | 3/2012 | Lee et al. | 362/235 |
| 2013/0044460 | A1 * | 2/2013 | Jang | 362/97.1 |

OTHER PUBLICATIONS

Chinese Office Action for Application 201310095016.0 dated Dec. 21, 2015 (full Chinese text).
Japanese Office Action issued in Application 2013-052834 dated Nov. 9, 2016 (full Japanese text).

* cited by examiner

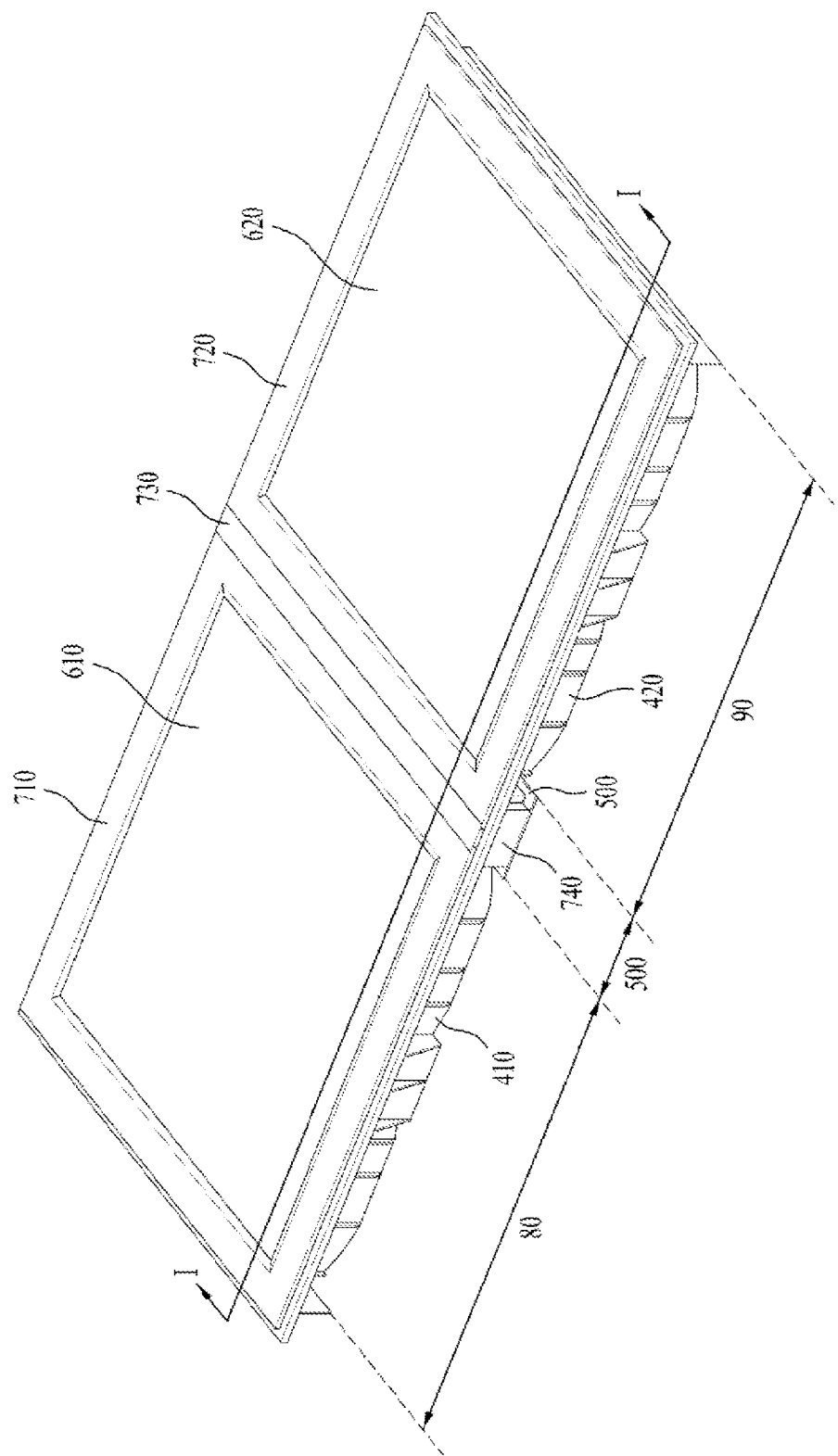
[FIG. 1A]

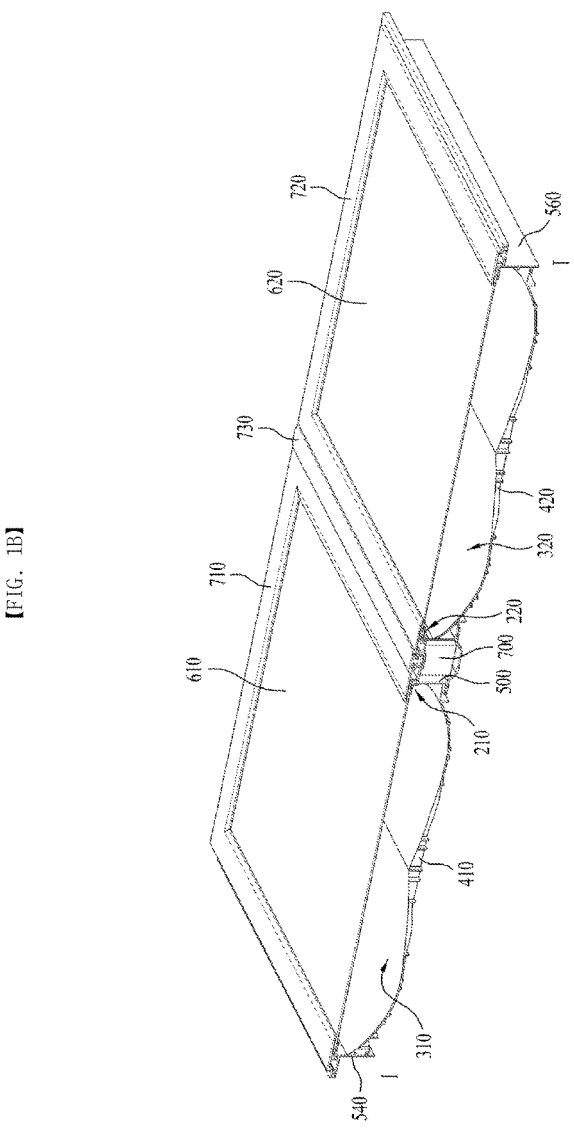
[FIG. 1B]

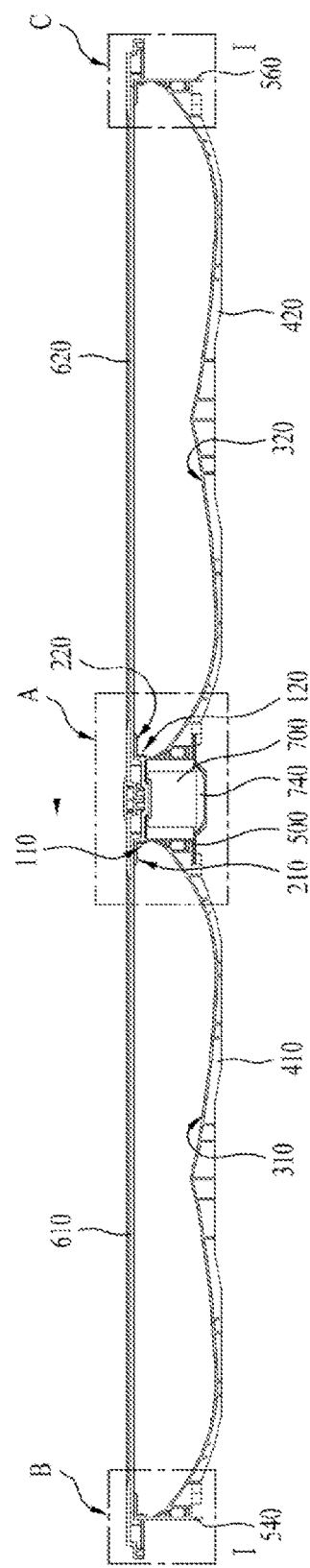

【FIG. 2】
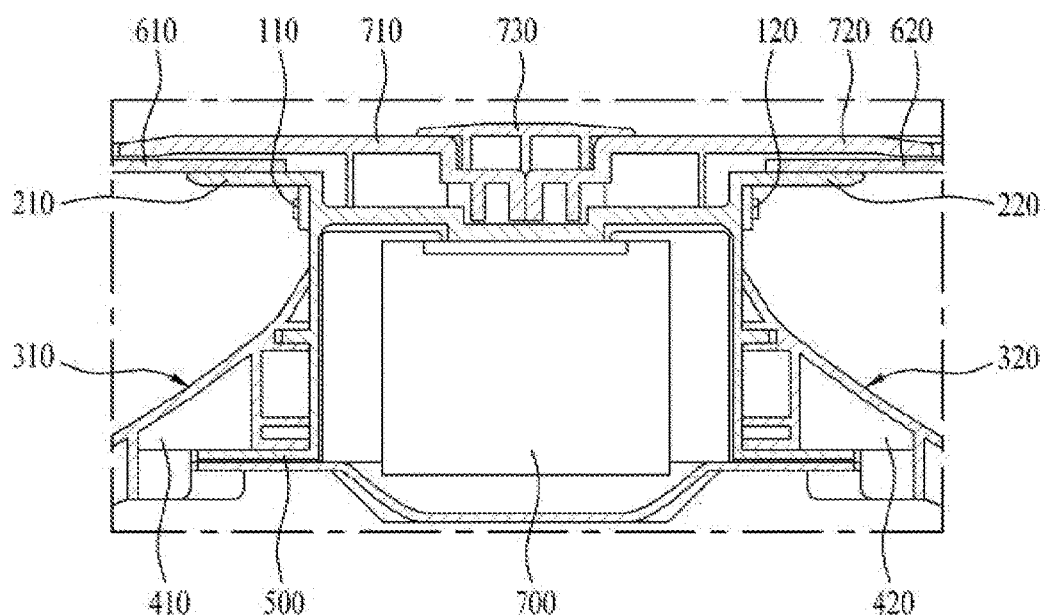
【FIG. 3】
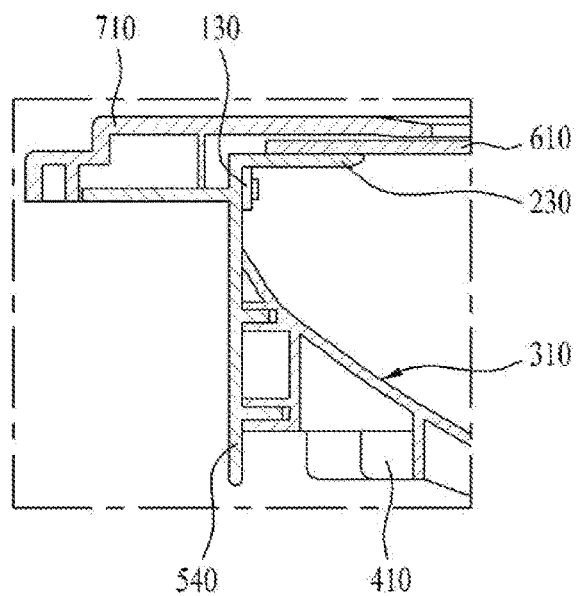

[FIG. 4]
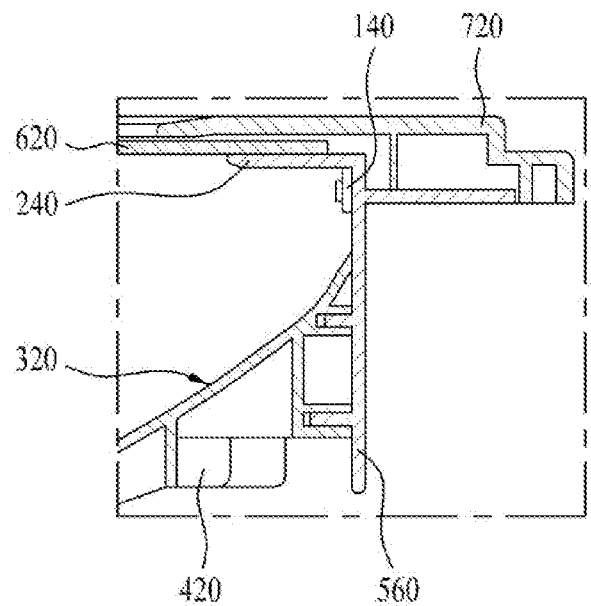
[FIG. 5]
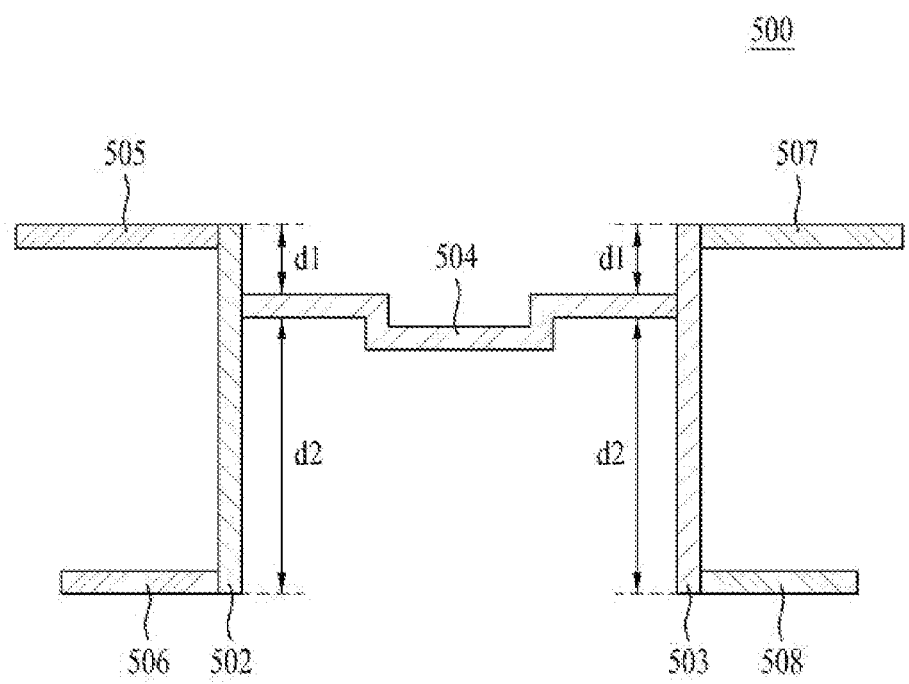

[FIG. 6A]
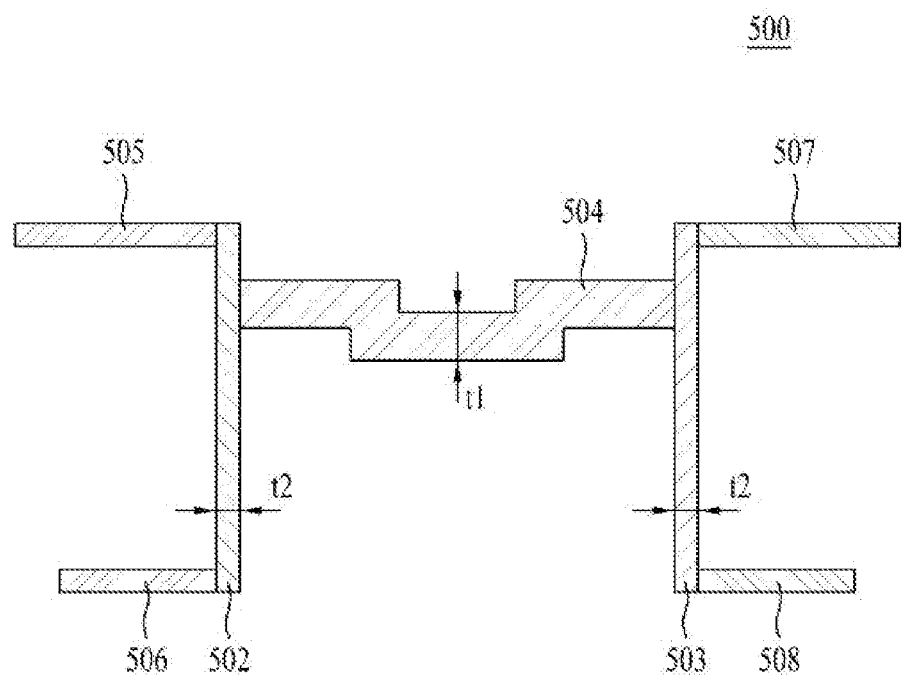
[FIG. 6B]
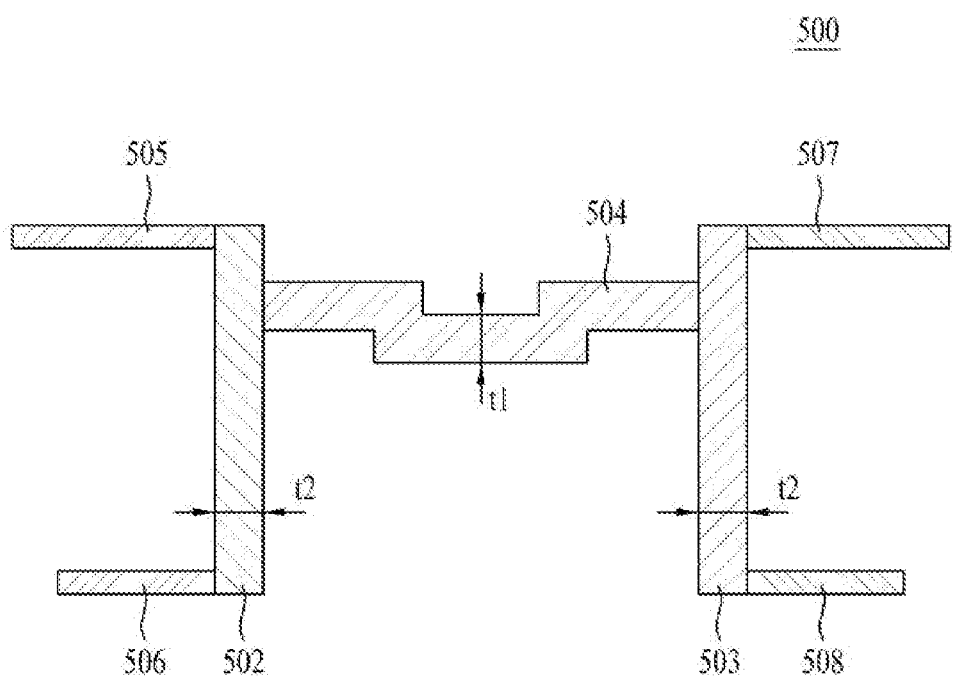

【FIG. 7】
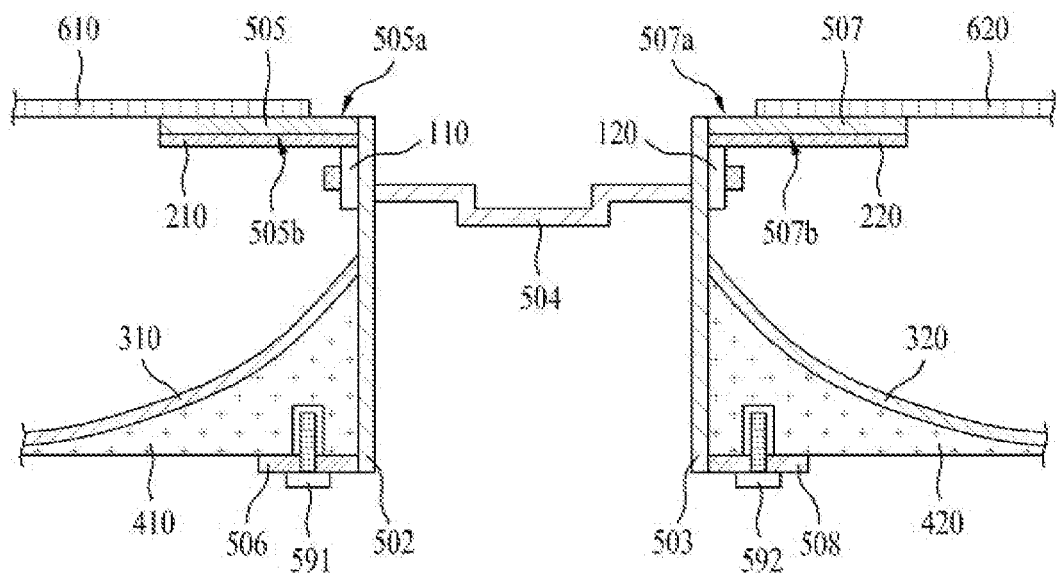
【FIG. 8A】
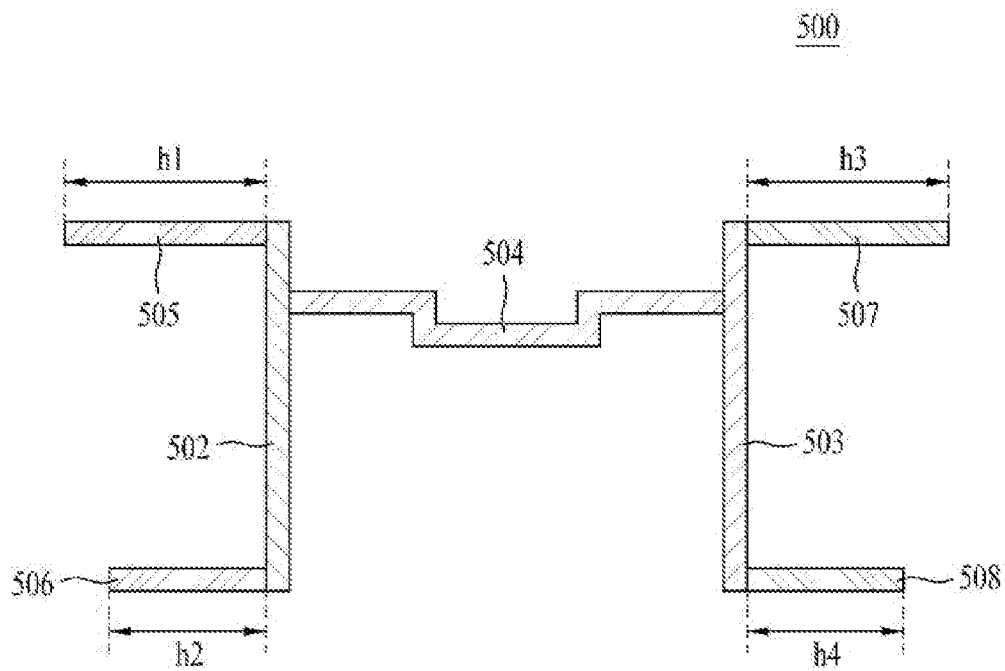

【FIG. 8B】
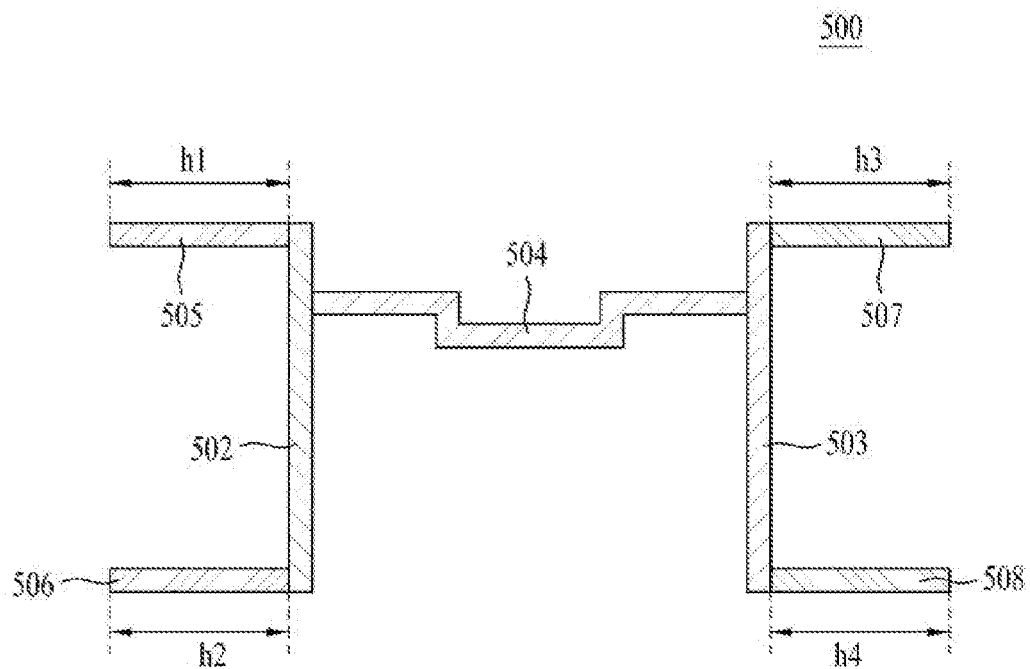
【FIG. 8C】
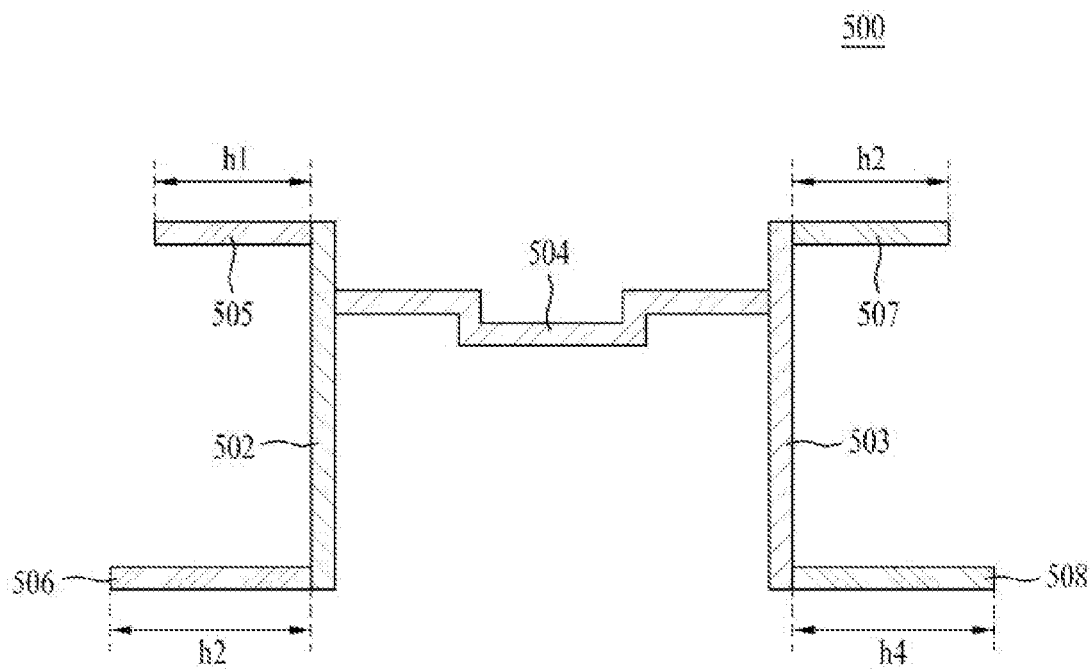

[FIG. 9A]
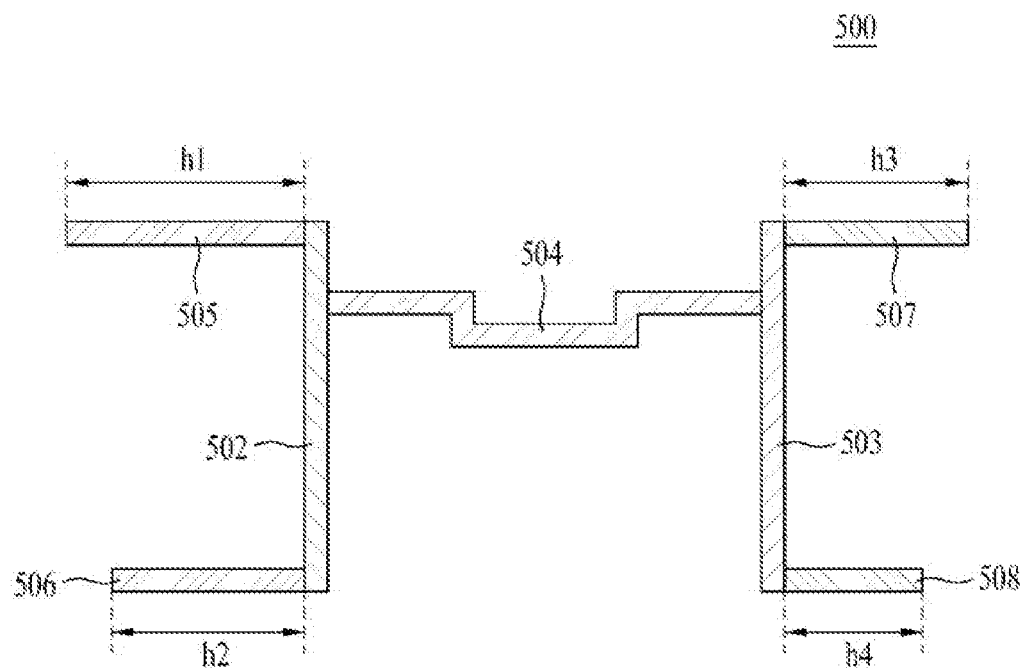
[FIG. 9B]
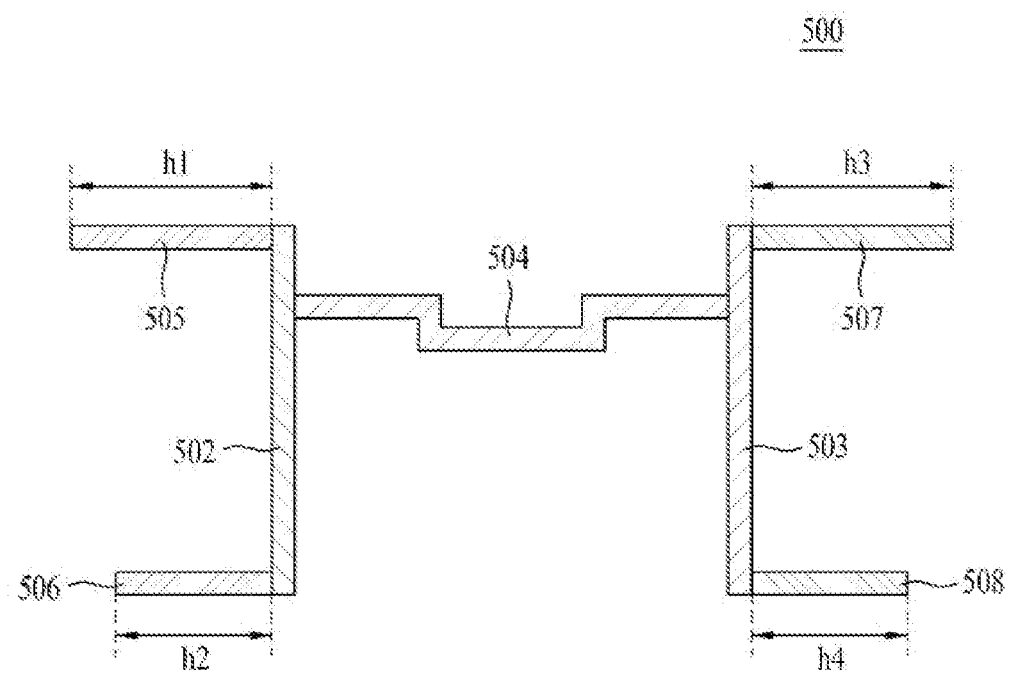

[FIG. 9C]
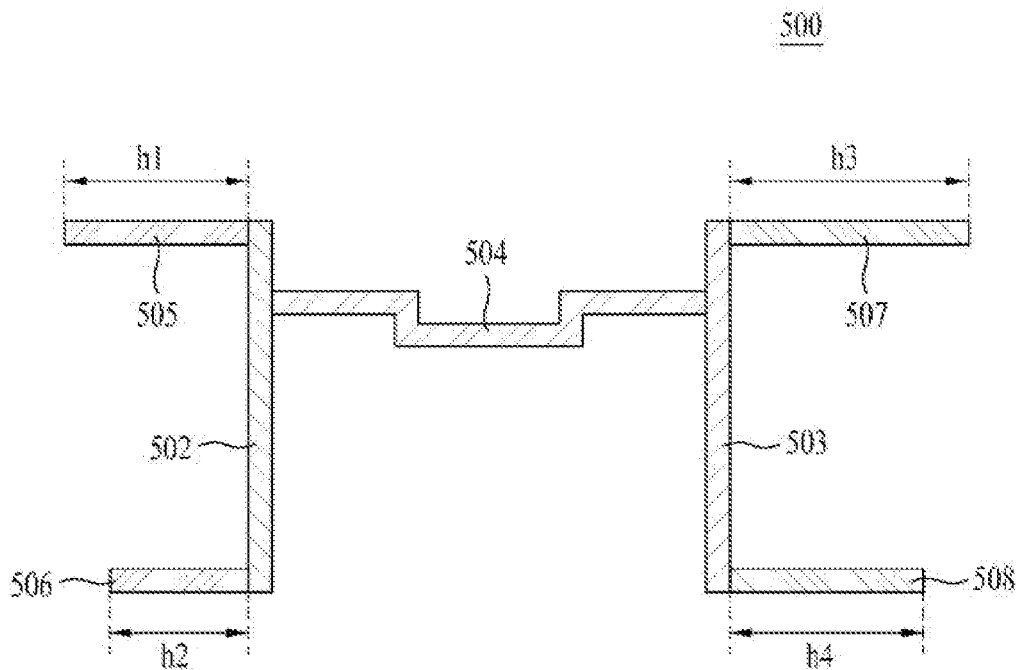
[FIG. 10]
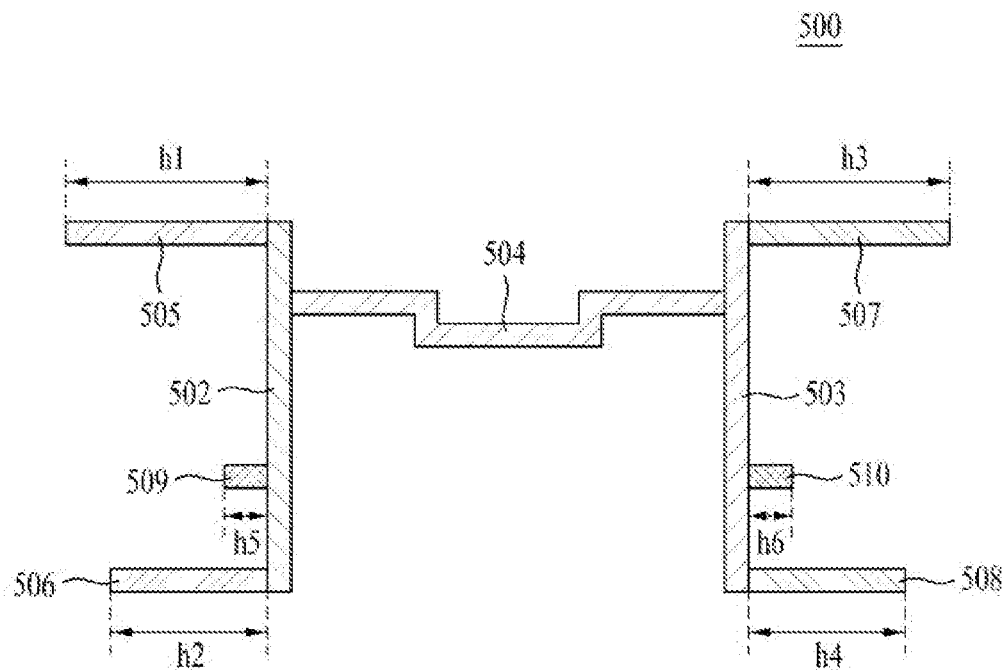

[FIG. 11A]
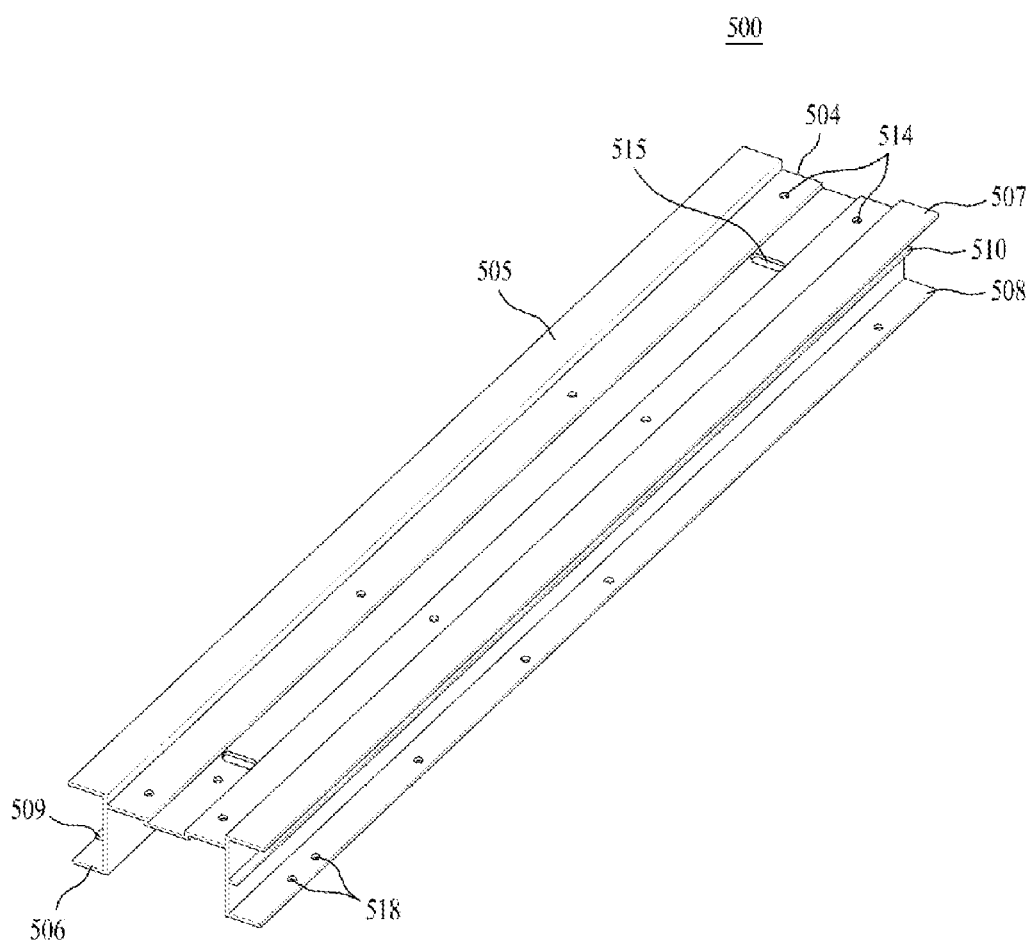

[FIG. 11B]
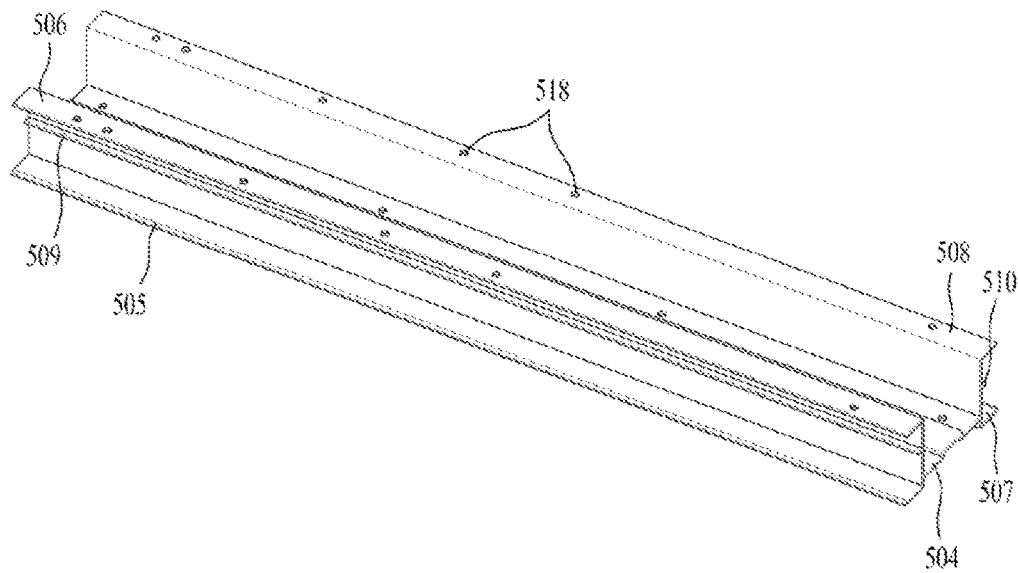
[FIG. 12A]
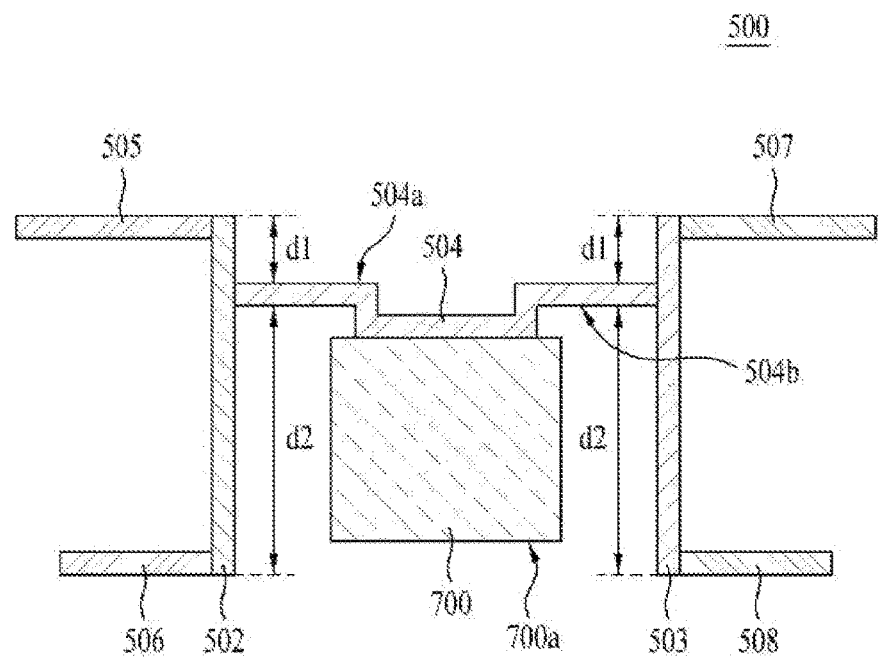

[FIG. 12B]
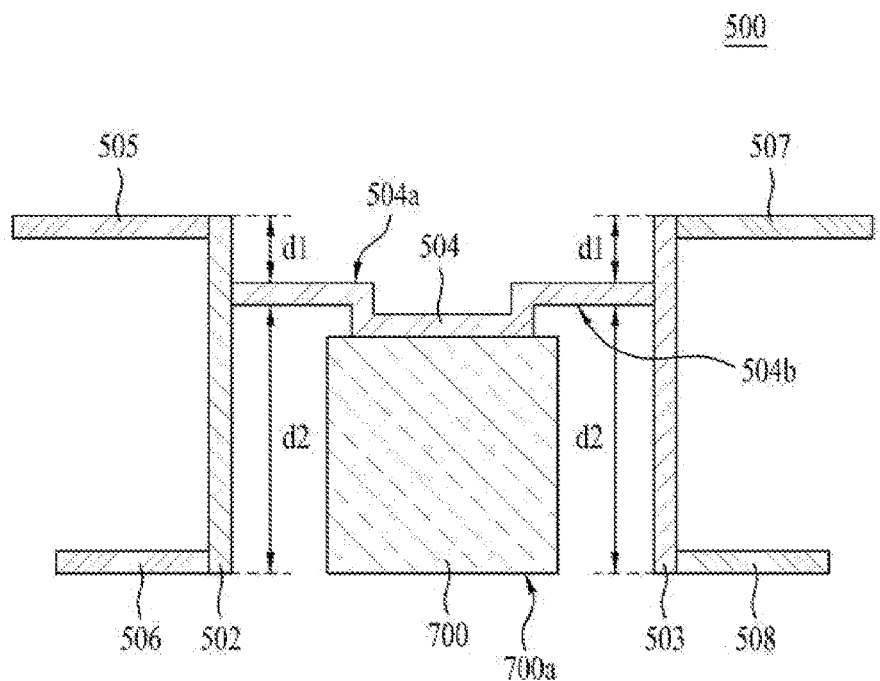
[FIG. 12C]
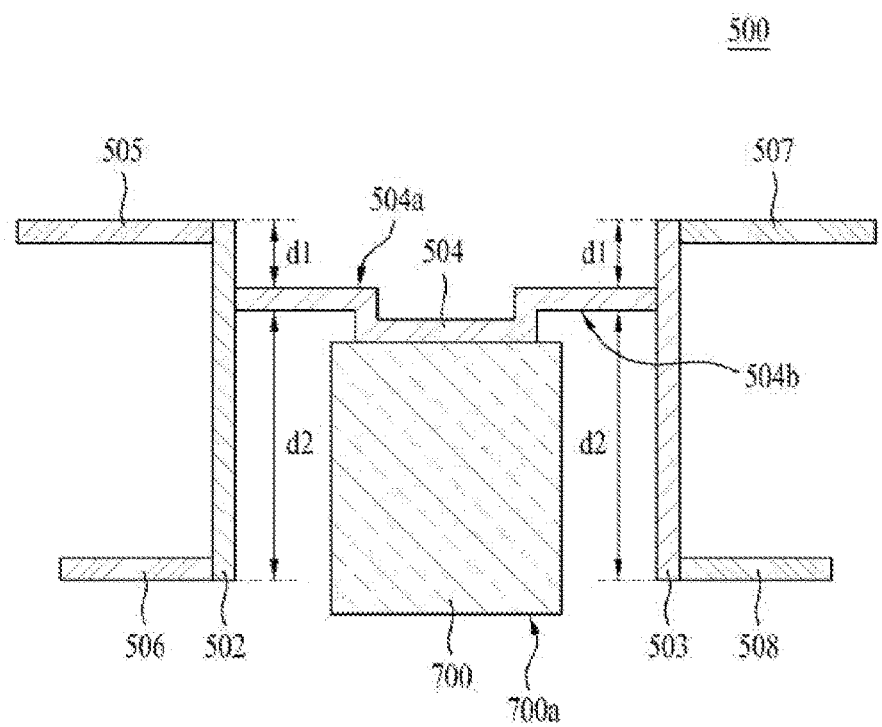

[FIG. 13A]
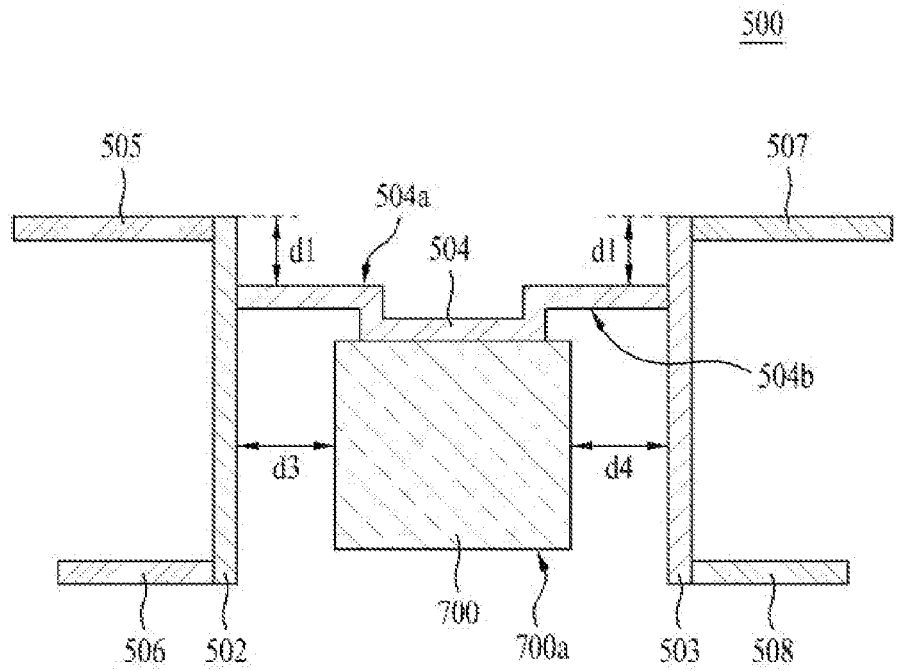
[FIG. 13B]
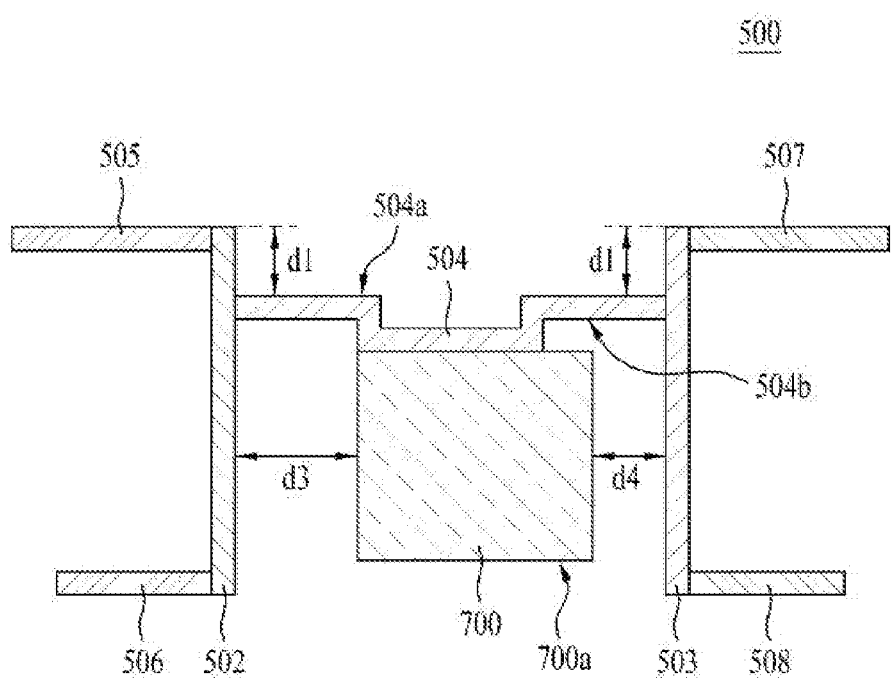

【FIG. 13C】
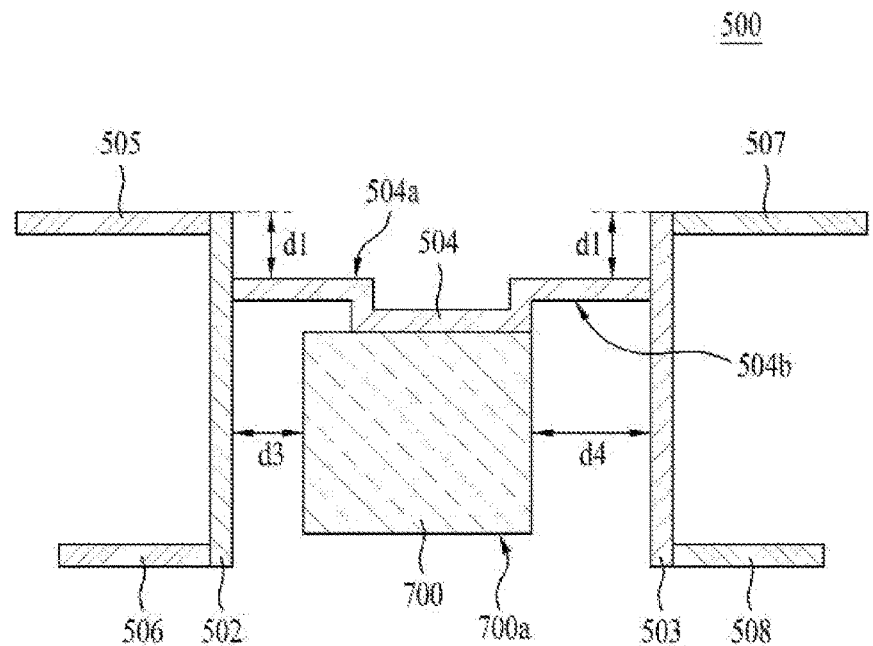
【FIG. 14】
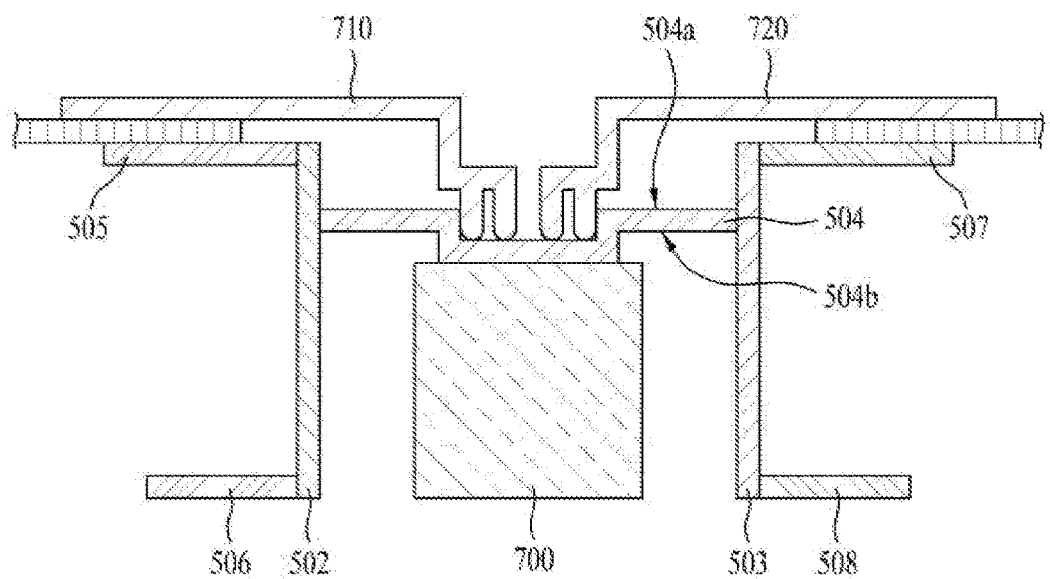

【FIG. 15A】
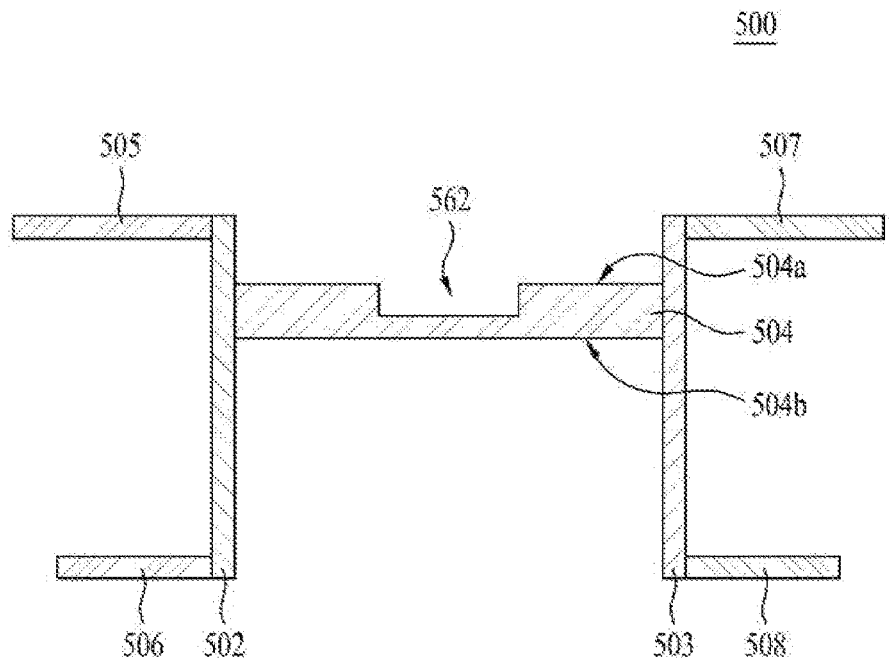
【FIG. 15B】
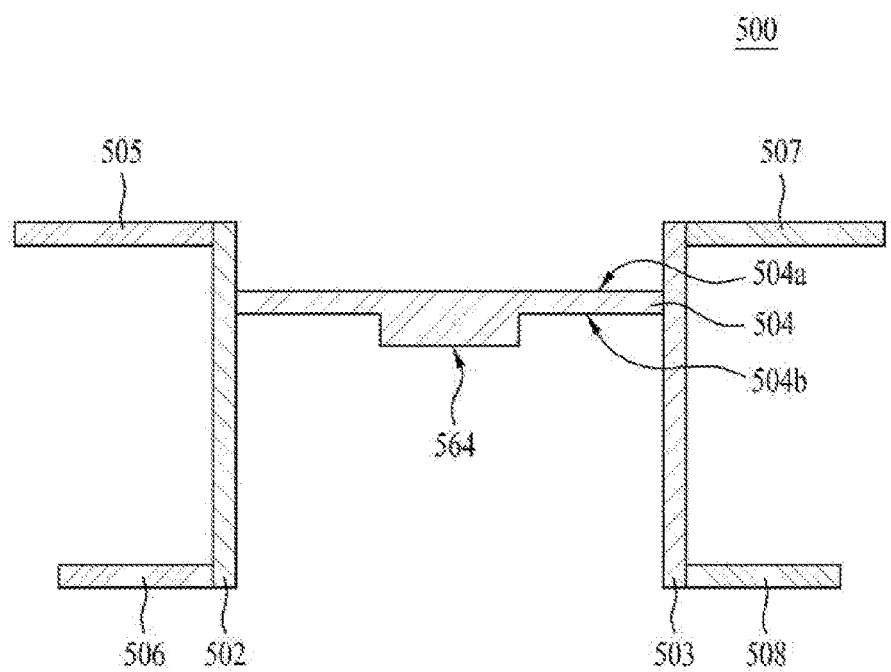

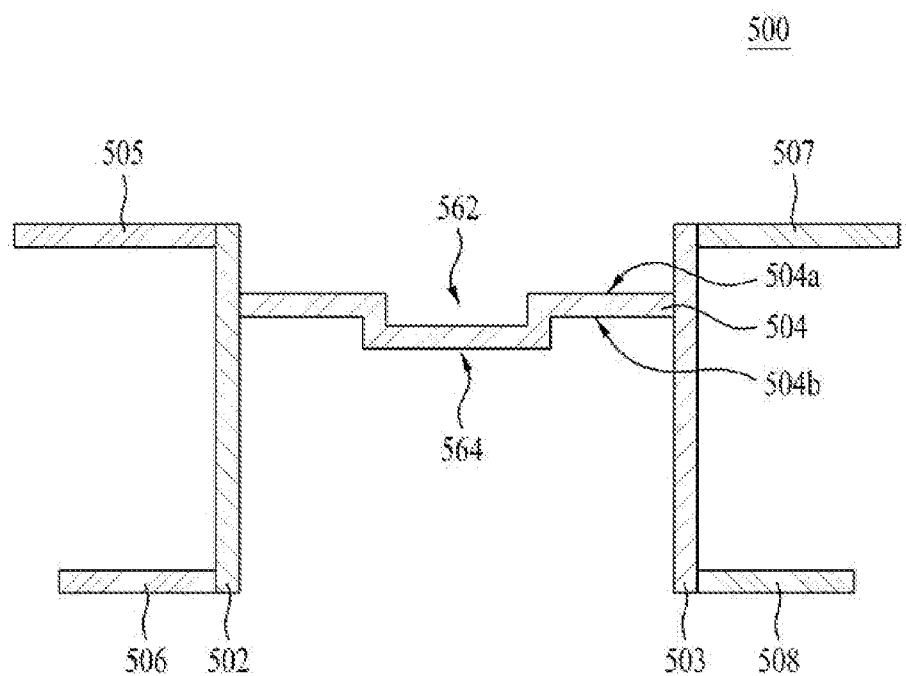
[FIG. 15C]

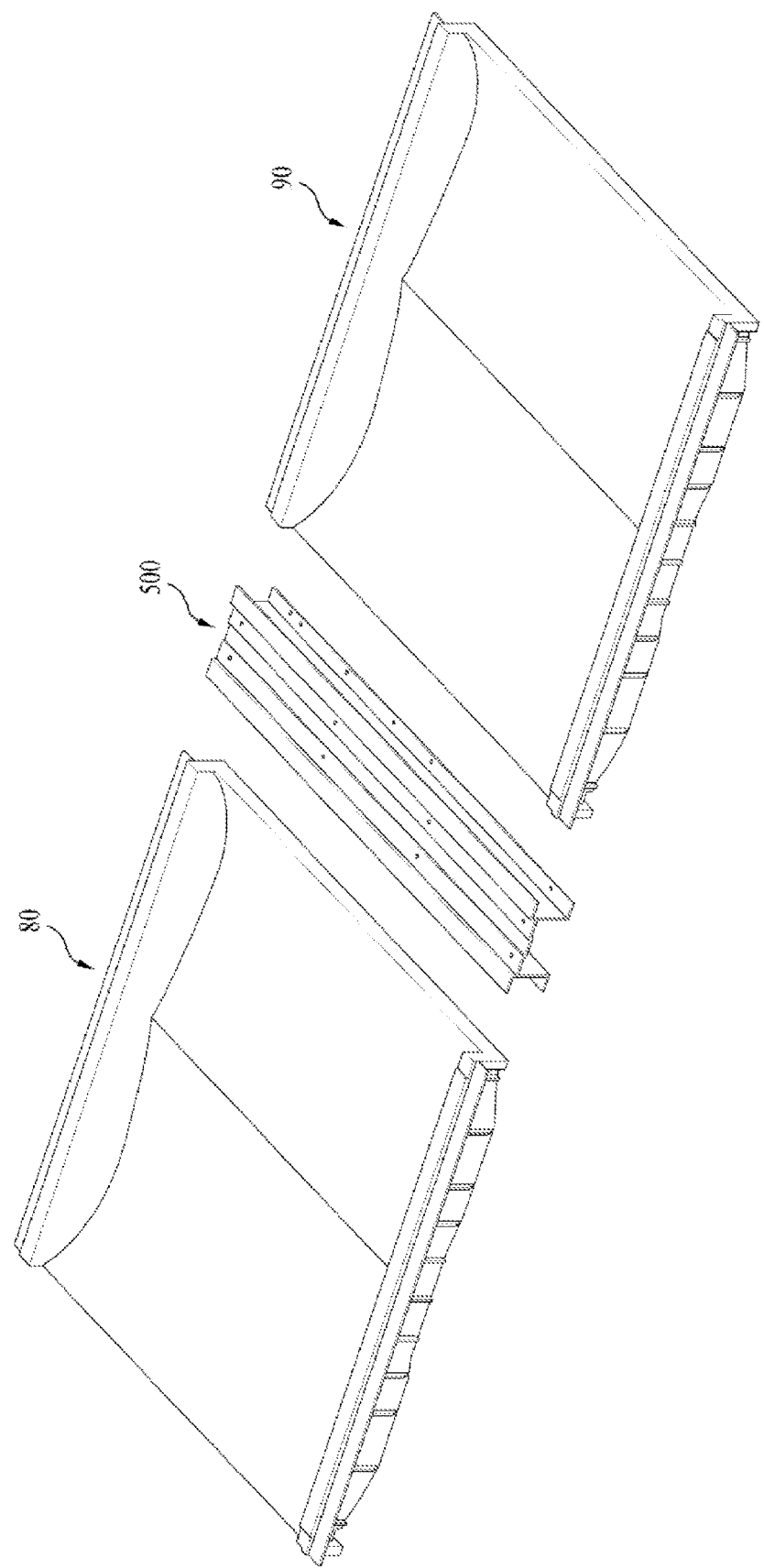

[FIG. 16B]
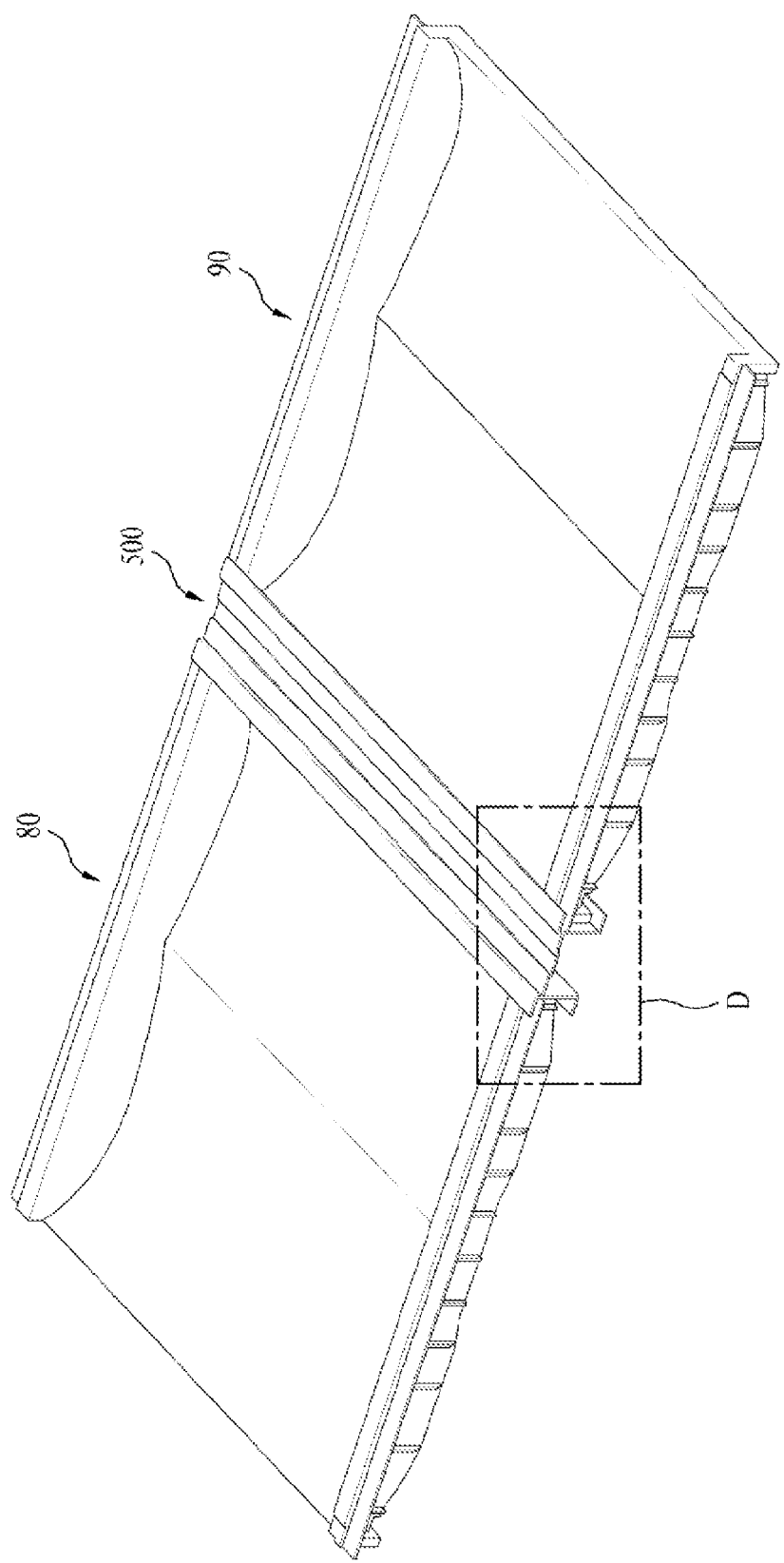

【FIG. 17】
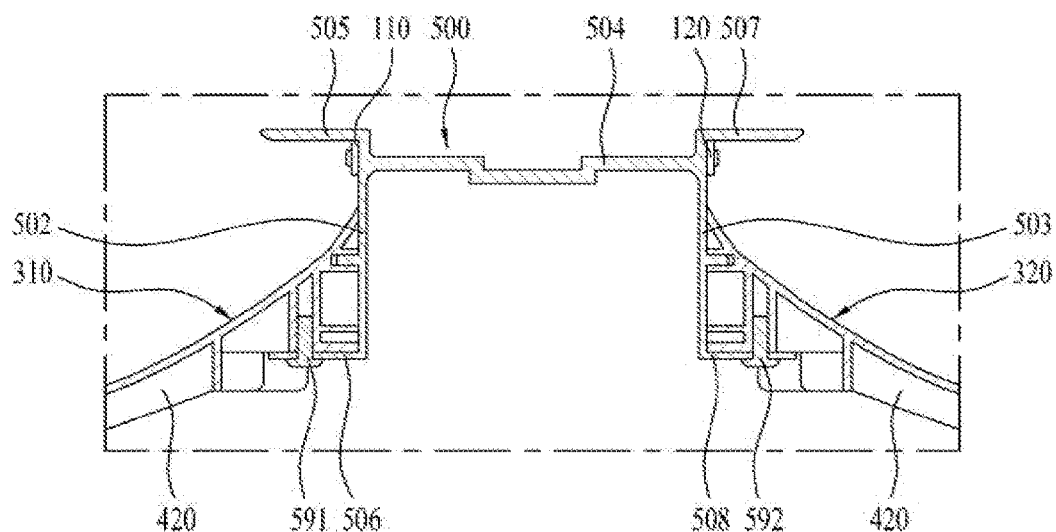
【FIG. 18】
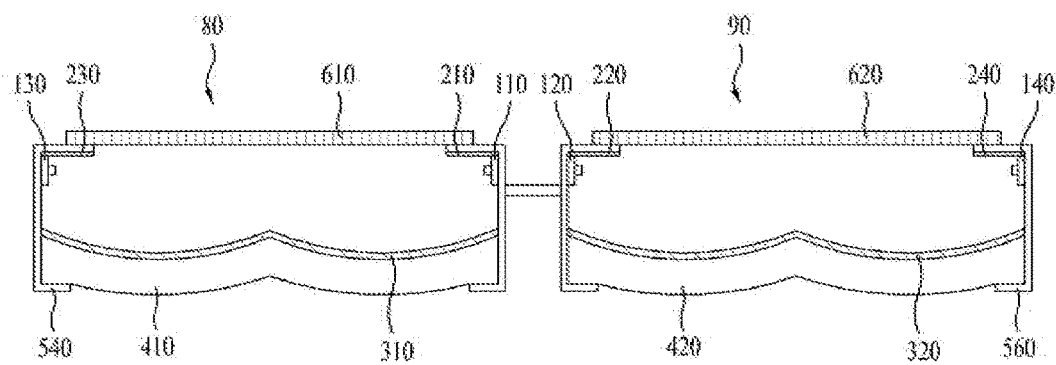

[FIG. 19]
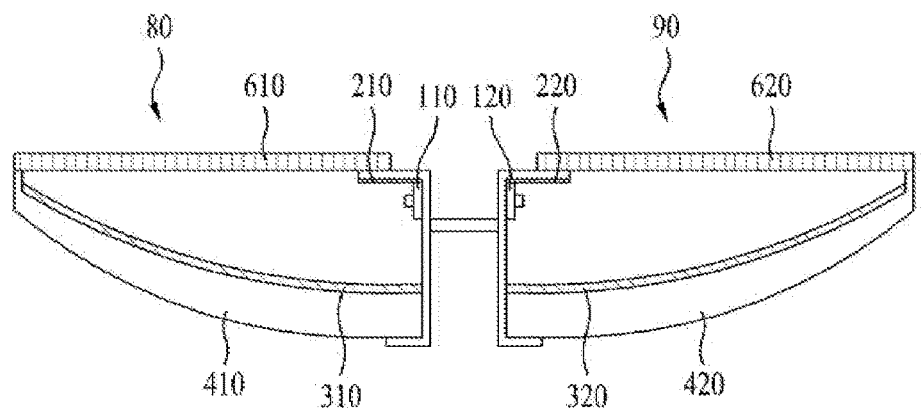
[FIG. 20]
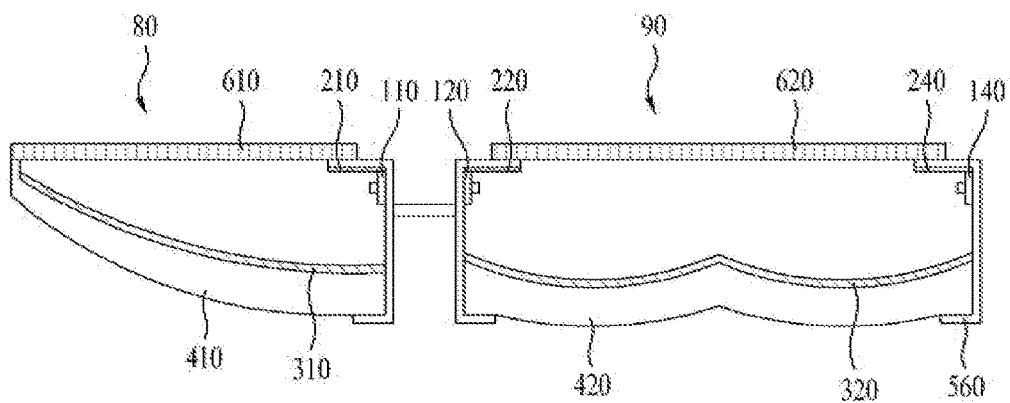

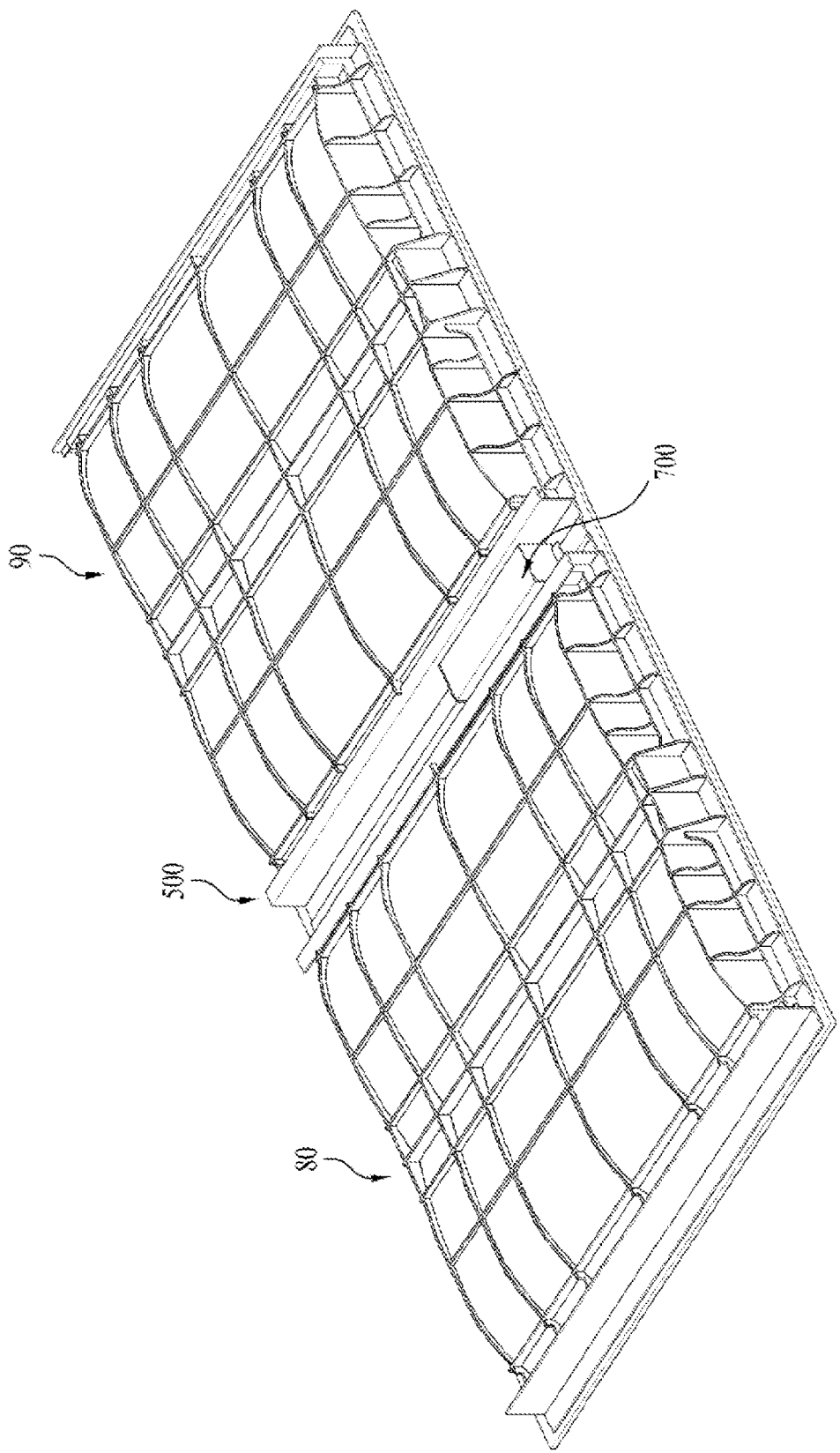

[FIG. 22]
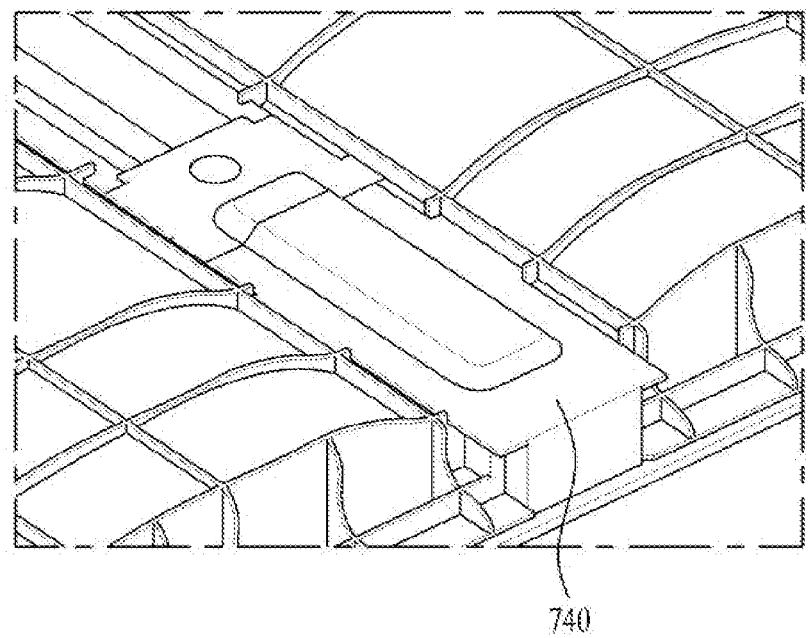
[FIG. 23A]
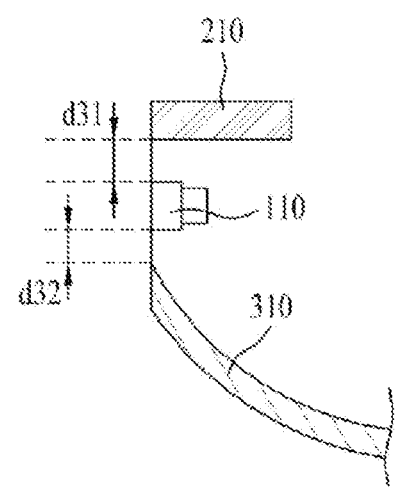

[FIG. 23B]
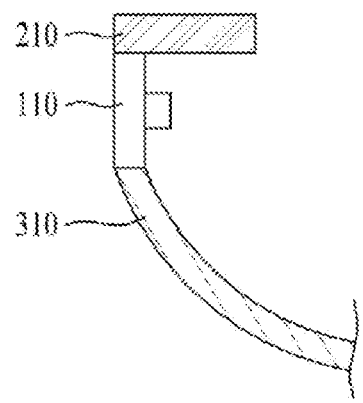
[FIG. 23C]
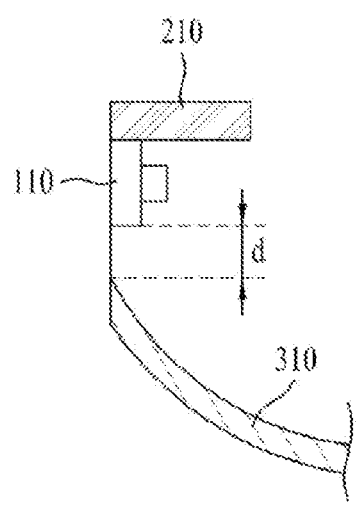

[FIG. 23D]
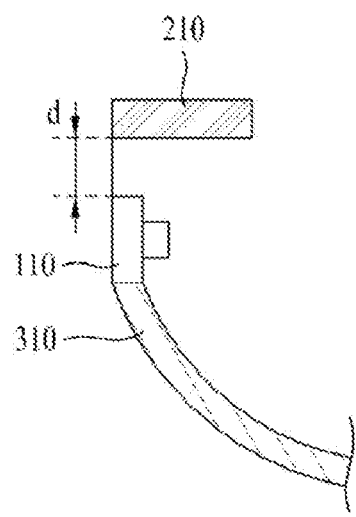
[FIG. 24A]
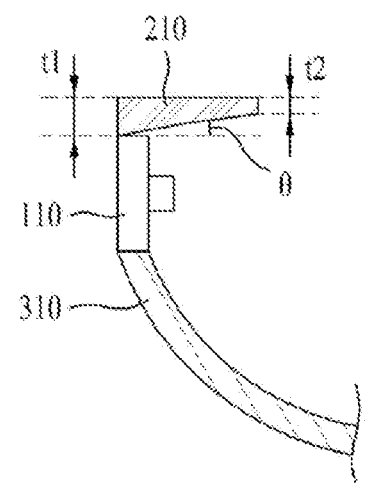

[FIG. 24B]
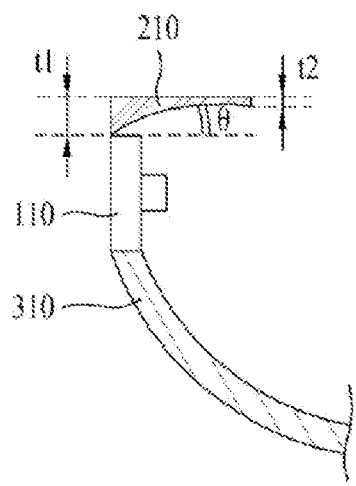
[FIG. 24C]
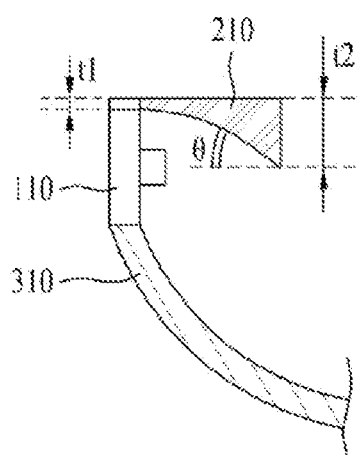

【FIG. 24D】
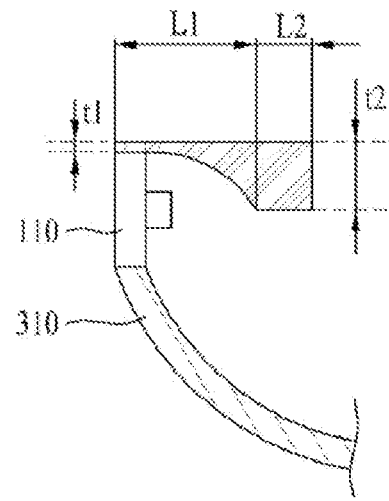
【FIG. 25A】
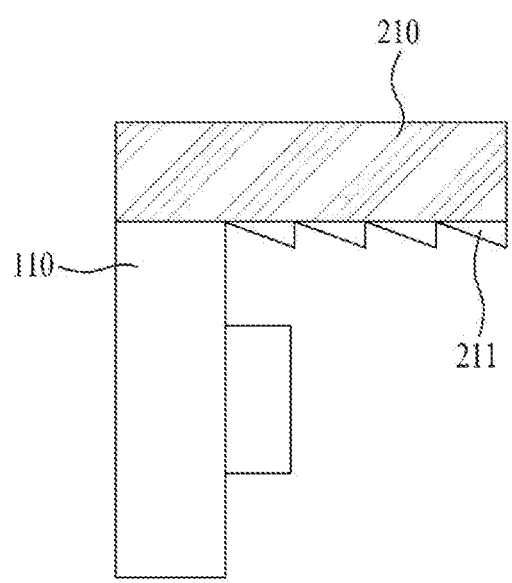

[FIG. 25B]
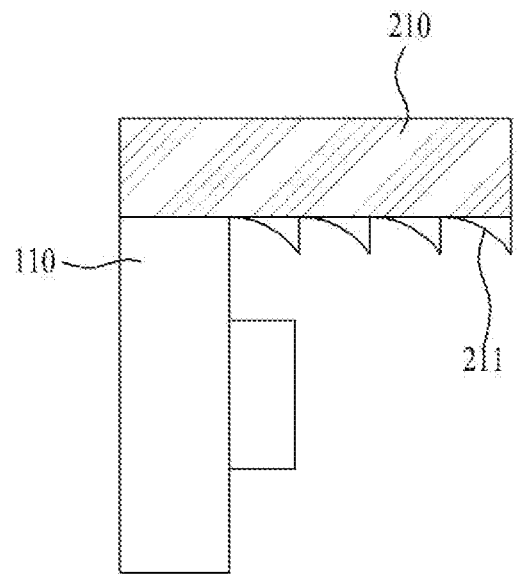
[FIG. 25C]
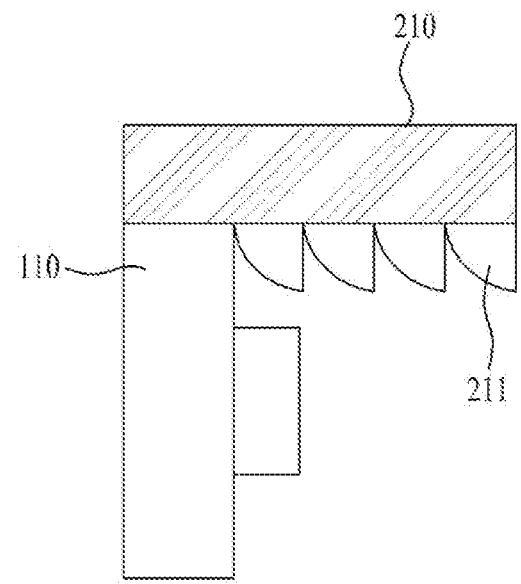

[FIG. 25D]
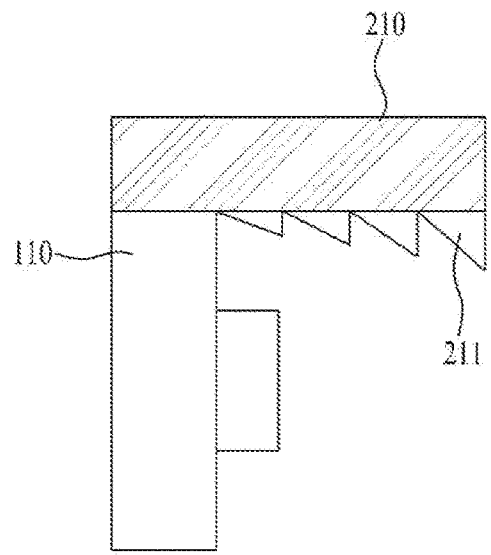
[FIG. 26]
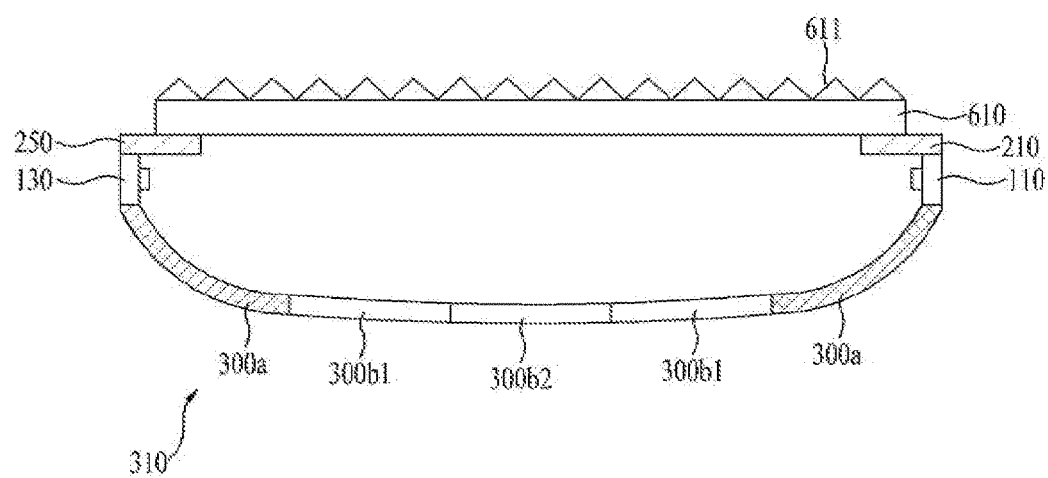

[FIG. 27]
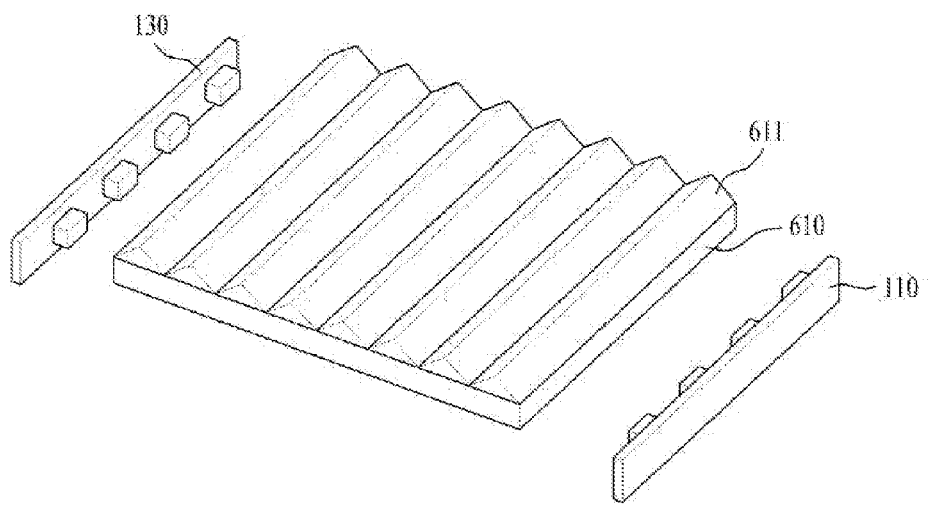
[FIG. 28]
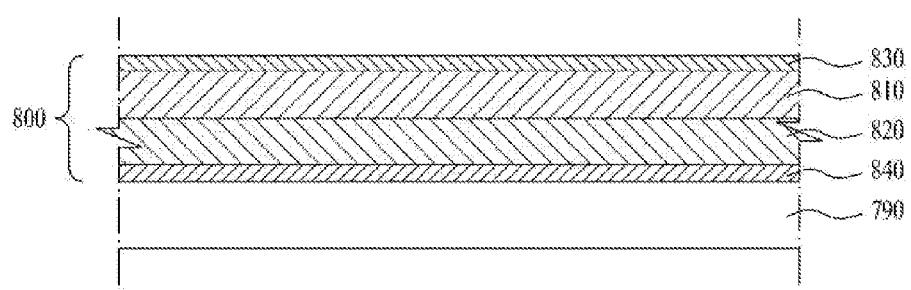

[FIG. 29]
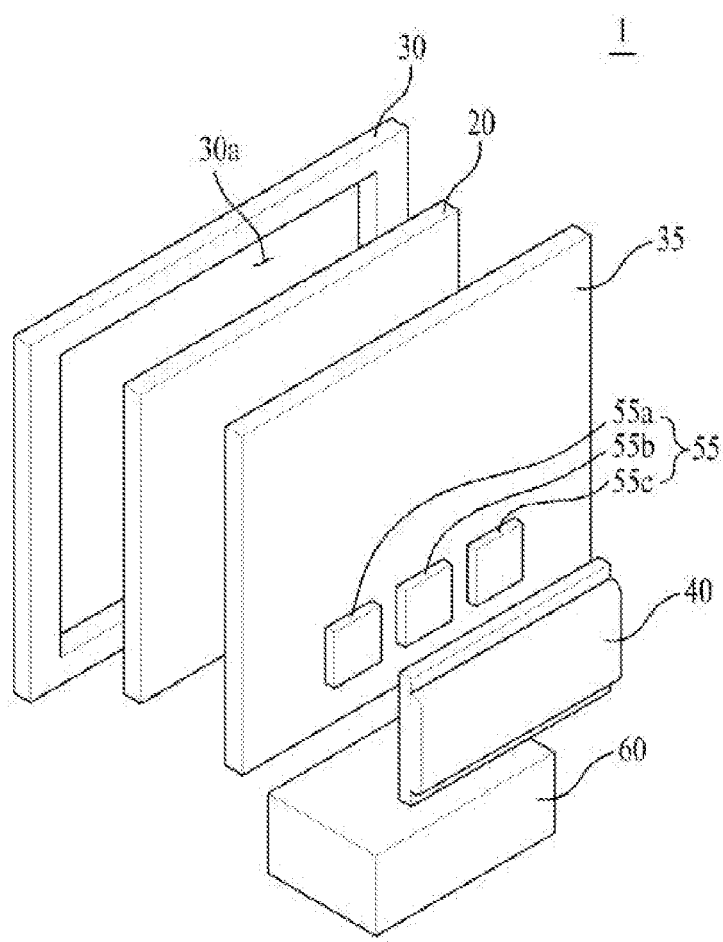

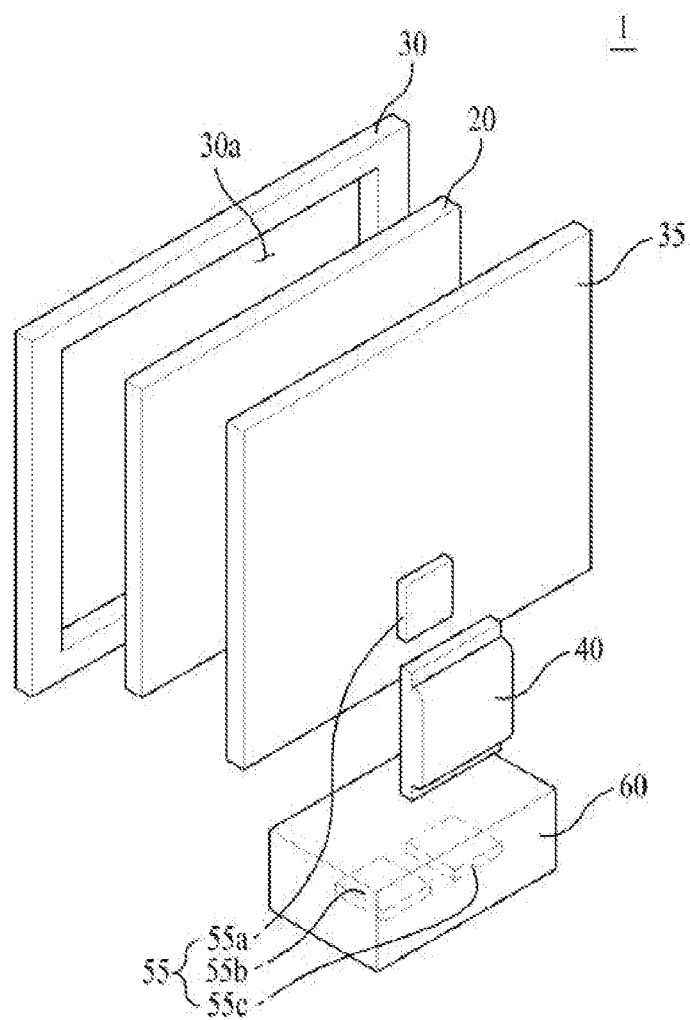
[FIG. 30]

ILLUMINATION UNIT AND DISPLAY APPARATUS USING THE SAME

CROSS REFERENCE TO RELATED APPLICATION

This application claims priority under 35 U.S.C. §119 to Korean Patent Application No. 10-2012-0029783, filed in Korea on Mar. 23, 2012, which is hereby incorporated in its entirety by reference as if fully set forth herein.

TECHNICAL FIELD

Embodiments relate to an illumination unit and a display apparatus using the same.

BACKGROUND

In general, downlights are constructed such that a light source is embedded in a ceiling hole. Such downlights have been widely used as architectural illumination means that integrate illumination with a building.

The downlight is embedded in the ceiling so as to be substantially prevented from being exposed outward, thus advantageously providing an orderly external appearance to the ceiling. Moreover, the downlight embedded in the ceiling may have low luminance and be suitable to form an intimate indoor space.

However, such an illumination unit configuration may be suitable for a narrow indoor space than a wide indoor space, and may need a great number of light sources such as Light Emitting Diodes (LEDs).

Accordingly, in the future, development of an illumination unit suitable for a wide indoor space even with a low number of LEDs is necessary.

SUMMARY

Embodiments provide an illumination unit which is suitable for fabrication of a large area illumination unit owing to using a double-sided bracket to which two illumination units are fastened, and a display apparatus using the same.

Further, embodiments provide an illumination unit which is suitable for a wide indoor space owing to using a reflector provided with a partial inclined surface, and a display apparatus using the same.

In one embodiment, an illumination unit includes a first illumination unit including a first light source module, a second illumination unit including a second light source module, and a bracket located between the first and second illumination units to connect the first and second illumination units to each other, wherein the bracket includes a first body portion on which the first light source module is placed, a second body portion on which the second light source module is placed, and a connecting portion located between the first and second body portions to connect the first and second body portions to each other, and wherein the connecting portion has a first distance from a first end of the first body portion or the second body portion, and has a second distance from a second end of the first body portion or the second body portion, and the second distance is greater than the first distance.

A ratio of the first distance to the second distance of the bracket may be in a range of about 1:1.1 to 1:30.

The second distance of the bracket may be in a range of about 20 mm to 80 mm.

The connecting portion of the bracket may have a first thickness, the first body portion or the second body portion may have a second thickness, and the first thickness may be greater than the second thickness.

A ratio of the first thickness to the second thickness may be in a range of about 1.01:1 to 5:1.

The bracket may include a first protrusion protruding from the first end of the first body portion in an opposite direction of the connecting portion, a second protrusion protruding from the second end of the first body portion in an opposite direction of the connecting portion, a third protrusion protruding from the first end of the second body portion in an opposite direction of the connecting portion, and a fourth protrusion protruding from the second end of the second body portion in an opposite direction of the connecting portion.

The first protrusion may come into contact with a reflector of the first illumination unit, the second protrusion may come into contact with a bottom cover of the first illumination unit, the third protrusion may come into contact with a reflector of the second illumination unit, and the fourth protrusion may come into contact with a bottom cover of the second illumination unit.

The first protrusion may protrude from the first body portion by a first height, the second protrusion may protrude from the first body portion by a second height, and the first height may be greater than the second height.

The third protrusion may protrude from the second body portion by a third height, the fourth protrusion may protrude from the second body portion by a fourth height, and the third height may be greater than the fourth height.

The first protrusion may protrude from the first body portion by a first height, the third protrusion may protrude from the second body portion by a third height, and the first height and the third height may differ from each other.

The bracket may further include a fifth protrusion located between the first and second protrusions, the fifth protrusion protruding from the first body portion in the same direction as the first protrusion, and a sixth protrusion located between the third and fourth protrusions, the sixth protrusion protruding from the second body portion in the same direction as the third protrusion.

The first protrusion may protrude from the first body portion by a first height, the second protrusion may protrude from the first body portion by a second height, the fifth protrusion may protrude from the first body portion by a fifth height, and the fifth height may be less than the first height and the second height.

The third protrusion may protrude from the second body portion by a third height, the fourth protrusion may protrude from the second body portion by a fourth height, the sixth protrusion may protrude from the second body portion by a sixth height, and the sixth height may be less than the third height and the fourth height.

The illumination unit may further include a power source unit provided between the first body portion and the second body portion of the bracket, the power source unit being coupled to the connecting portion of the bracket.

The power source unit may be wholly or partially arranged within a range of the second distance between the second end of the first body portion or the second body portion and the connecting portion.

The power source unit may have a third distance from the first body portion and a fourth distance from the second body portion.

The third distance and the fourth distance may differ from each other.

The connecting portion of the bracket may include an upper surface and a lower surface opposite to each other, and a cover member may be placed on the upper surface of the connecting portion, or a power source unit may be placed on the lower surface of the connecting portion.

A coupling recess may be formed in the upper surface of the connecting portion, and the cover member may come into contact with the coupling recess.

A coupling bump may be formed at the lower surface of the connecting portion, and the power source unit may come into contact with the coupling bump.

In another embodiment, an illumination unit includes a first illumination unit including a first light source module, a second illumination unit including a second light source module, and a bracket located between the first and second illumination units to connect the first and second illumination units to each other, wherein the bracket includes a first body portion on which the first light source module is placed, a second body portion on which the second light source module is placed, and a connecting portion located between the first and second body portions to connect the first and second body portions to each other, and wherein a power source unit is provided between the first body portion and the second body portion of the bracket to supply power to the first and second light source modules, and wherein the power source unit is coupled to the connecting portion of the bracket.

The power source unit may have a third distance from the first body portion and a fourth distance from the second body portion, and the third distance and the fourth distance may differ from each other.

In a further embodiment, an illumination unit includes a first illumination unit including a first light source module, a second illumination unit including a second light source module, and a bracket located between the first and second illumination units to connect the first and second illumination units to each other, wherein the bracket includes a first body portion on which the first light source module is placed, a second body portion on which the second light source module is placed, and a connecting portion located between the first and second body portions to connect the first and second body portions to each other, and wherein the connecting portion has a first thickness and the first body portion or the second body portion has a second thickness, and the first thickness is greater than the second thickness.

A ratio of the first thickness to the second thickness may be in a range of about 1.01:1 to 5:1.

The first illumination unit may include first and second reflectors, a first light source module located between the first and second reflectors, and a first optical member spaced apart from the second reflector by a predetermined distance, and an air guide may be defined in a space between the second reflector and the first optical member.

The second illumination unit may include third and fourth reflectors, a second light source module located between the third and fourth reflectors, and a second optical member spaced apart from the fourth reflector by a predetermined distance, and an air guide may be defined in a space between the fourth reflector and the second optical member.

BRIEF DESCRIPTION OF THE DRAWINGS

Arrangements and embodiments may be described in detail with reference to the following drawings in which like reference numerals refer to like elements and wherein:

FIGS. 1A to 1C are explanatory views illustrating an illumination unit according to an embodiment;

FIGS. 2 to 4 are enlarged sectional views illustrating a partial region of FIG. 1;

FIG. 5 is a sectional view illustrating a bracket of FIG. 2;

FIGS. 6A and 6B are sectional views illustrating thicknesses of body portions and a connecting portion of the bracket;

FIG. 7 is a sectional view illustrating the bracket fastened to first and second illumination units;

FIGS. 8A to 8C are sectional views illustrating heights of protrusions of the bracket according to a first embodiment;

FIGS. 9A to 9C are sectional views illustrating heights of protrusions of the bracket according to a second embodiment;

FIG. 10 is a sectional view illustrating heights of protrusions of the bracket according to a third embodiment;

FIGS. 11A and 11B are perspective views illustrating the bracket;

FIGS. 12A to 12C are sectional views illustrating arrangement of a power source unit according to a first embodiment;

FIGS. 13A to 13C are sectional views illustrating arrangement of a power source unit according to a second embodiment;

FIG. 14 is a sectional view illustrating the connecting portion of the bracket;

FIGS. 15A to 15C are sectional views illustrating a coupling region of the connecting portion of the bracket;

FIGS. 16A and 16B are perspective views illustrating coupling between the bracket and the first and second illumination units;

FIG. 17 is an enlarged sectional view illustrating the region D of FIG. 16B;

FIG. 18 is a sectional view illustrating the bracket to which double-edge type illumination units are fastened;

FIG. 19 is a sectional view illustrating the bracket to which single-edge type illumination units are fastened;

FIG. 20 is a sectional view illustrating the bracket to which a single-edge type illumination unit and a double-edge type illumination unit are fastened;

FIG. 21 is a bottom perspective view of the bracket illustrating the power source unit placed on the lower surface of the bracket;

FIG. 22 is a perspective view illustrating a cover member of the power source unit;

FIGS. 23A to 23D are explanatory views illustrating an arrangement relationship between a first light source module and first and second reflectors;

FIGS. 24A to 24D are views illustrating a first reflector having an inclined surface;

FIGS. 25A to 25D are views illustrating a first reflector having a reflective pattern;

FIG. 26 is a sectional view illustrating a reflective surface of the second reflector;

FIG. 27 is a perspective view illustrating a first optical member;

FIG. 28 is a view illustrating a display module having an illumination unit according to an embodiment; and FIGS. 29 and 30 are views illustrating a display apparatus according to an embodiment.

DESCRIPTION OF SPECIFIC EMBODIMENTS

Hereinafter, embodiments will be described with reference to the annexed drawings.

It will be understood that when an element is referred to as being 'on' or "under" another element, it can be directly on/under the element, and one or more intervening elements may also be present.

Also, when an element is referred to as being 'on' or 'under', 'under the element' as well as 'on the element' can be included based on the element.

FIGS. 1A to 1C are explanatory views illustrating an illumination unit according to an embodiment. FIG. 1A is a top perspective view, FIG. 1B is a perspective view illustrating an inner surface taken along the line I-I of FIG. 1A, and FIG. 1C is a sectional view taken along the line I-I of FIG. 1A.

As illustrated in FIGS. 1A to 1C, according to the embodiment, a first illumination unit 80, a second illumination unit 90, and a bracket 500 that connects the first and second illumination units 80 and 90 to each other may be provided.

The first illumination unit 80 may include first and second reflectors 210 and 310, a first light source module 110, a first optical member 610, a first bottom cover 410, and a first cover member 710.

The second illumination unit 90 may include third and fourth reflectors 220 and 320, a second light source module 120, a second optical member 620, a second bottom cover 420, and a second cover member 720.

The bracket 500 may be a double-sided bracket, and may be located between the first and second illumination units 80 and 90 to connect the first and second illumination units 80 and 90 to each other.

A power source unit 700 to supply power to the first and second illumination units 80 and 90 and a fourth cover member 740 may be arranged below the bracket 500, and a third cover member 730 may be arranged above the bracket 500.

The embodiment having the aforementioned configuration will hereinafter be described in more detail.

FIGS. 2 to 4 are enlarged sectional views illustrating a partial region of FIG. 1. FIG. 2 is a sectional view illustrating the region A of FIG. 1C, FIG. 3 is a sectional view illustrating the region B of FIG. 1C, and FIG. 4 is a sectional view illustrating the region C of FIG. 1C.

As illustrated in FIGS. 2 to 4, the first illumination unit 80 may be a double-edge type illumination unit. The first light source module 110 may be placed at one side of the second reflector 310, and a third light source module 130 may be placed at the other side of the second reflector 310.

As occasion demands, the first illumination unit 80 may be a single-edge type illumination unit in which the first light source module 110 is located only at one side of the second reflector 310.

If the first illumination unit 80 is a double-edge type illumination unit, the first light source module 110 of the first illumination unit 80 may be installed to the bracket 500, and the third light source module 130 of the first illumination unit 80 may be installed to a first heat bar 540.

In this case, the first light source module 110 may be located between the first reflector 210 and the second reflector 310 at a position close to the first reflector 210 or the second reflector 310.

As occasion demands, the first light source module 110 may come into contact with the first reflector 210 while being spaced apart from the second reflector 310 by a predetermined distance, or the first light source module 110 may come into contact with the second reflector 310 while being spaced apart from the first reflector 210 by a predetermined distance.

Alternatively, the first light source module 110 may be spaced apart from the first reflector 210 and the second reflector 310 by predetermined distances, or may come into contact with both the first reflector 210 and the second reflector 310.

The first light source module 110 may include a board having an electrode pattern, and at least one light source placed on the board.

Here, the light source of the first light source module 110 may be a top view type light emitting diode.

As occasion demands, the light source may be a side view type light emitting diode.

The board may be a Printed Circuit Board (PCB) formed of any one material selected from among polyethyleneterephthalate (PET), glass, polycarbondate (PC), and silicon (Si), and may take the form of a film.

Also, a single layer PCB, a multilayer PCB, a ceramic board, a metal core PCB, or the like may be selectively used as the board.

The board may be provided with any one of a reflective coating film and a reflective coating material layer, to reflect light emitted from the light source to a central region of the second reflector 310.

The light source may be a Light Emitting Diode (LED) chip. The LED chip may be a blue LED chip or an ultraviolet LED chip, or may be a package combining at least one or more selected from among a red LED chip, a green LED chip, a blue LED chip, a yellow green LED chip, and a white LED chip.

A white LED may be realized by coupling a yellow phosphor to a blue LED, by coupling both red and green phosphors to a blue LED, or by coupling yellow, red and green phosphors to a blue LED.

The first reflector 210 and the second reflector 310 may be arranged to face each other and may be spaced apart from each other by a predetermined distance. As such, an air guide may be defined in a space between the first reflector 210 and the second reflector 310.

The first reflector 210 may be formed of any one of a reflective coating film and a reflective coating material layer, and may serve to reflect light emitted from the first light source module 110 toward the second reflector 310.

A saw-toothed reflective pattern may be formed on a surface of the first reflector 210 facing the first light source module 110. The reflective pattern may be flat or may be curved.

The reason for providing the surface of the first reflector 210 with the reflective pattern is to reflect light emitted from the first light source module 110 to the central region of the second reflector 310, thereby increasing luminance of a central region of a backlight unit.

The second reflector 310 may be supported by the first bottom cover 410. The second reflector 310 may be formed of a metal or metal oxide having high reflectivity, such as aluminum (Al), silver (Ag), gold (Au) or titanium dioxide ($TiO_2$).

The second reflector 310 may partially be provided with an inclined surface. The inclined surface of the second reflector 310 may overlap with at least one of the first light source module 110 and the first reflector 210.

The inclined surface of the second reflector 310 may have a predetermined inclination angle with respect to a surface of the first reflector 200. The inclined surface may be at least one of a concave surface, a convex surface and a flat surface.

As occasion demands, the second reflector 310 may include at least one inclined surface and at least one flat surface. The flat surface of the second reflector 310 may be a surface parallel to the first reflector 210.

The second reflector 310 may include at least two inclined surfaces having at least one inflection point. That is, first and second inclined surfaces, which are next to each other about the inflection point, may have different radii of curvature.

The third light source module 130 of the first illumination unit 80 may be placed at the first heat bar 540. The third light source module 130 may be located between a fifth reflector 230 and the second reflector 310 at a position close to the fifth reflector 230 or the second reflector 310.

The first bottom cover 410 of the first illumination unit 80 may be configured to support only the second reflector 310. The first bottom cover 410 may include a conductive material.

Although the entire first bottom cover 410 may serve as a conductor, only a portion of the first bottom cover 410 may be a conductor as occasion demands.

The reason for forming the first bottom cover 410 of a conductive material is to prevent damage to an external circuit due to static electricity.

As occasion demands, the first bottom cover 410 may be partially provided with an inclined surface. The first bottom cover 410 may be formed of a metal or metal oxide having high reflectivity, such as aluminum (Al), silver (Ag), gold (Au) or titanium dioxide ($TiO_2$).

The first optical member 610 of the first illumination unit 80 may be spaced apart from the second reflector 310 by a predetermined distance.

As such, an air guide may be defined in a space between the second reflector 310 and the first optical member 610.

The first optical member 610 may have a roughened pattern formed on an upper surface thereof.

The first optical member 610 may serve to diffuse light emitted from the first light source module 110. To increase diffusion effects, the roughened pattern may be formed on the upper surface of the first optical member 610.

More specifically, the first optical member 610 may have a multilayer form. The roughened pattern may be an uppermost layer or any one layer of the first optical member 610.

The roughened pattern may have a stripe shape extending along the first light source module 110.

In this case, the roughened pattern may include ridges formed on the surface of the first optical member 610. The respective ridges may have a first face and a second face facing each other, and an angle between the first face and the second face may be an acute angle or an obtuse angle.

As occasion demands, the first optical member 610 may be formed of at least one sheet. More specifically, the first optical member 610 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

The second illumination unit 90 may be a double-edge type illumination unit. The second light source module 120 may be placed at one side of the fourth reflector 320, and a fourth light source module 140 may be placed at the other side of the fourth reflector 320.

As occasion demands, the second illumination unit 90 may be a single-edge type illumination unit in which the second light source module 120 is placed only at one side of the fourth reflector 320.

If the second illumination unit 90 is a double-edge type illumination unit, the second light source module 120 of the second illumination unit 90 may be installed to the bracket 500, and the fourth light source module 140 of the second illumination unit 90 may be installed to a second heat bar 560.

In this case, the second light source module 120 may be located between the third reflector 220 and the fourth reflector 320 at a position close to the third reflector 220 or the fourth reflector 320.

As occasion demands, the second light source module 120 may come into contact with the third reflector 220 while being spaced apart from the fourth reflector 320 by a predetermined distance, or the second light source module 120 may come into contact with the fourth reflector 320 while being spaced apart from the third reflector 220 by a predetermined distance.

Alternatively, the second light source module 120 may be spaced apart from the third reflector 220 and the fourth reflector 320 by predetermined distances, or may come into contact with both the third reflector 220 and the fourth reflector 320.

The second light source module 120, the third reflector 220, and the fourth reflector 320 of the second illumination unit 90 are equal to the first light source module 110, the first reflector 210, and the second reflector 310 of the first illumination unit 80, and thus a detailed description thereof will be omitted.

The fourth light source module 140 of the second illumination unit 90 may be placed at the second heat bar 560. The fourth light source module 140 may be located between a sixth reflector 240 and the fourth reflector 320 at a position close to the sixth reflector 240 or the fourth reflector 320.

The second bottom cover 420 of the second illumination unit 90 may be configured to support only the fourth reflector 320. The second bottom cover 420 may include a conductive material.

Although the entire second bottom cover 420 may serve as a conductor, only a portion of the second bottom cover 420 may be a conductor as occasion demands.

The reason for forming the second bottom cover 420 of a conductive material is to prevent damage to an external circuit due to static electricity.

As occasion demands, the second bottom cover 420 may be partially provided with an inclined surface. The second bottom cover 420 may be formed of a metal or metal oxide having high reflectivity, such as aluminum (Al), silver (Ag), gold (Au) or titanium dioxide ($TiO_2$).

The second optical member 620 of the second illumination unit 90 may be spaced apart from the fourth reflector 320 by a predetermined distance.

As such, an air guide may be defined in a space between the fourth reflector 320 and the second optical member 620.

The second optical member 620 of the second illumination unit 90 is equal to the first optical member 610 of the first illumination unit 80, and thus a detailed description thereof will be omitted.

The bracket 500 may be located between the first illumination unit 80 and the second illumination unit 90, to connect the first illumination unit 80 and the second illumination unit 90 to each other.

The bracket 500 may consist of a first body portion, a second body portion, and a connecting portion.

The first light source module 110 may be placed at the first body portion of the bracket 500, and the second light source module 120 may be placed at the second body portion of the bracket 500.

The connecting portion of the bracket 500 may be placed between the first body portion and the second body portion of the bracket 500, to connect the first body portion and the second body portion to each other.

In this case, the connecting portion of the bracket 500 may have a first distance from a first end of the first body portion or the second body portion, and may have a second distance from a second end of the first body portion or the second body portion. Here, the second distance may be greater than the first distance.

The power source unit 700 to supply power to the first and second illumination units 80 and 90 and the fourth cover member 740 may be arranged below the bracket 500, and the third cover member 730 may be arranged above the bracket 500.

Although the entire bracket 500 may be a conductor, only a portion of the bracket 500 may be a conductor as occasion demands.

The reason for forming the bracket 500 of a conductive material is to prevent damage to the power source unit 700 due to static electricity.

FIG. 5 is a sectional view illustrating the bracket of FIG. 2.

As illustrated in FIG. 5, the bracket 500 may be located between the first illumination unit (80, see FIG. 1A) and the second illumination unit (90, see FIG. 1A), and may connect the first illumination unit (80, see FIG. 1A) and the second illumination unit (90, see FIG. 1A) to each other.

The bracket 500 may consist of a first body portion 502, a second body portion 503, and a connecting portion 504.

The first light source module (110, see FIG. 2) may be placed at the first body portion 502 of the bracket 500, and the second light source module (120, see FIG. 2) may be placed at the second body portion 503 of the bracket 500.

The connecting portion 504 of the bracket 500 may be placed between the first body portion 502 and the second body portion 503 of the bracket 500, to connect the first body portion 502 and the second body portion 503 to each other.

In this case, the connecting portion 504 of the bracket 500 may have a first distance d1 from a first end of the first body portion 502 or the second body portion 503, and may have a second distance d2 from a second end of the first body portion 502 or the second body portion 503. Here, the second distance d2 may be greater than the first distance d1.

A ratio of the first distance d1 to the second distance d2 of the bracket 500 may be in a range of about 1:1.1 to 1:30.

For example, the second distance d2 of the bracket 500 may be in a range of about 20 mm to 80 mm.

The reason for arranging the connecting portion 504 as described above is because the power source unit (700, see FIG. 2) is arranged below the connecting portion 504 of the bracket 500.

That is, when the second distance d2 is greater than the first distance d1, a space for installation of the power source unit (700, see FIG. 2) may be acquired.

Arranging the power source unit (700, see FIG. 2) below the connecting portion 504 of the bracket 500 has the effect of reducing a thickness of the entire illumination unit.

Moreover, the bracket 500 formed of a conductive material may prevent damage to the power source unit 700 due to static electricity.

The first light source module (110, see FIG. 2) of the first illumination unit (80, see FIG. 1A) may be placed at the first body portion 502 of the bracket 500, and the second light source module (120, see FIG. 2) of the second illumination unit (90, see FIG. 1A) may be placed at the second body portion 503 of the bracket 500.

The bracket 500 may include a first protrusion 505 and a second protrusion 506 which protrude from the first body portion 502, and a third protrusion 507 and a fourth protrusion 508 which protrude from the second body portion 503.

The first protrusion 505 may protrude from the first end of the first body portion 502 in an opposite direction of the connecting portion 504, and the second protrusion 505 may protrude from the second end of the first body portion 502 in an opposite direction of the connecting portion 504.

The third protrusion 507 may protrude from the first end of the second body portion 503 in an opposite direction of the connecting portion 504, and the fourth protrusion 508 may protrude from the second end of the second body portion 503 in an opposite direction of the connecting portion 504.

In this case, the first protrusion 505 may come into contact with the first reflector (210, see FIG. 2) of the first illumination unit (80, see FIG. 1A), and the second protrusion 506 may come into contact with the first bottom cover 410 of the first illumination unit (80, see FIG. 1A).

The third protrusion 507 may come into contact with the third reflector (220, see FIG. 2) of the second illumination unit (90, see FIG. 1A), and the fourth protrusion 508 may come into contact with the second bottom cover 420 of the second illumination unit (90, see FIG. 1A).

FIGS. 6A and 6B are sectional views illustrating thicknesses of the body portions and the connecting portion of the bracket.

As illustrated in FIGS. 6A and 6B, the bracket 500 may consist of the first body portion 502, the second body portion 503, and the connecting portion 504.

The connecting portion 504 of the bracket 500 may be placed between the first body portion 502 and the second body portion 503 of the bracket 500, and may connect the first body portion 502 and the second body portion 503 to each other.

In this case, the connecting portion 504 of the bracket 500 may have a first thickness t1, and the first body portion 502 or the second body portion 503 of the bracket 500 may have a second thickness t2. As illustrated in FIG. 6A, the first thickness t1 may be greater than the second thickness t2.

A ratio of the first thickness t1 to the second thickness t2 may be in a range of about 1.01:1 to 5:1.

The reason for providing the connecting portion 504 of the bracket 500 with a greater thickness than a thickness of the first body portion 502 or the second body portion 503 of the bracket 500 is because the power source unit (700, see FIG. 2) is arranged below the connecting portion 504 of the bracket 500.

Accordingly, to acquire a space required for coupling between the connecting portion 504 of the bracket 500 and the power source unit (700, see FIG. 2) and to prevent the connecting portion 504 from being bent by the weight of the power source unit (700, see FIG. 2), it is desirable that the connecting portion 504 have a predetermined thickness.

As occasion demands, as illustrated in FIG. 6B, the connecting portion 504 of the bracket 500 and the first body portion 502 or the second body portion 504 of the bracket 500 may have the same thickness.

For example, if the power source unit (700, see FIG. 2) does not have a large size, the power source unit (700, see FIG. 2) must have a small weight, and therefore the connecting portion 504 of the bracket 500 and the first body portion 502 or the second body portion 504 of the bracket 500 may be formed to have the same thickness.

The bracket 500 may include the first protrusion 505 and the second protrusion 506 which protrude from the first body portion 502, and the third protrusion 507 and the fourth protrusion 508 which protrude from the second body portion 503.

The first protrusion 505 may come into contact with the first reflector (210, see FIG. 2) of the first illumination unit (80, see FIG. 1A), and the second protrusion 506 may come into contact with the first bottom cover 410 of the first illumination unit (80, see FIG. 1A).

The third protrusion 507 may come into contact with the third reflector (220, see FIG. 2) of the second illumination unit (90, see FIG. 1A), and the fourth protrusion 508 may come into contact with the second bottom cover 420 of the second illumination unit (90, see FIG. 1A).

FIG. 7 is a sectional view illustrating the bracket fastened to the first and second illumination units.

As illustrated in FIG. 7, the bracket 500 may consist of the first body portion 502, the second body portion 503, and the connecting portion 504.

The bracket 500 may include the first protrusion 505 and the second protrusion 506 which protrude from the first body portion 502, and the third protrusion 507 and the fourth protrusion 508 which protrude from the second body portion 503.

The first protrusion 505 may protrude from the first end of the first body portion 502 in an opposite direction of the connecting portion 504, and the second protrusion 505 may protrude from the second end of the first body portion 502 in an opposite direction of the connecting portion 504.

The third protrusion 507 may protrude from the first end of the second body portion 503 in an opposite direction of the connecting portion 504, and the fourth protrusion 508 may protrude from the second end of the second body portion 503 in an opposite direction of the connecting portion 504.

The first light source module 110 may be placed at the first body portion 502 of the bracket 500, and the second light source module 120 may be placed at the second body portion 503 of the bracket 500.

The connecting portion 504 of the bracket 500 may be placed between the first body portion 502 and the second body portion 503 of the bracket 500, and may connect the first body portion 502 and the second body portion 503 to each other.

In this case, the connecting portion 504 of the bracket 500 may be arranged opposite to the first light source module 110 on the first body portion 502 and the second light source module 120 on the second body portion 503.

The first reflector 210 of the first illumination unit (80, see FIG. 1A) may be placed on a lower surface 505b of the first protrusion 505 of the bracket 500, and the first optical member 610 may be placed on an upper surface 505a of the first protrusion 505 of the bracket 500.

The second protrusion 506 of the bracket 500 may come into contact with the first bottom cover 410 of the first illumination unit (80, see FIG. 1A).

Here, the second protrusion 506 of the bracket 500 may be fastened to the first bottom cover 410 by a first fastening screw 591.

The third reflector 220 of the second illumination unit (90, see FIG. 1A) may be placed on a lower surface 507b of the third protrusion 507 of the bracket 500, and the second optical member 620 may be placed on an upper surface 507a of the third protrusion 507 of the bracket 500.

The fourth protrusion 508 of the bracket 500 may come into contact with the second bottom cover 420 of the second illumination unit (90, see FIG. 1A).

Here, the fourth protrusion 508 of the bracket 500 may be fastened to the second bottom cover 420 by a second fastening screw 592.

FIGS. 8A to 8C are sectional views illustrating heights of the protrusions of the bracket according to a first embodiment.

As illustrated in FIGS. 8A to 8C, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The bracket 500 may include the first protrusion 505 and the second protrusion 506 which protrude from the first body portion 502, and the third protrusion 507 and the fourth protrusion 508 which protrude from the second body portion 503.

The first protrusion 505 of the bracket 500 may protrude from the first body portion 502 by a first height h1, and the second protrusion 506 of the bracket 500 may protrude from the first body portion 502 by a second height h2.

In this case, as illustrated in FIG. 8A, the first height h1 may be greater than the second height h2.

As occasion demands, as illustrated in FIG. 8B, the first height h1 and the second height h2 may be equal to each other.

Alternatively, as illustrated in FIG. 8C, the first height h1 may be less than the second height h2.

The third protrusion 507 of the bracket 500 may protrude from the second body portion 503 by a third height h3, and the fourth protrusion 508 of the bracket 500 may protrude from the second body portion 503 by a fourth height h4.

In this case, as illustrated in FIG. 8A, the third height h3 may be greater than the fourth height h4.

As occasion demands, as illustrated in FIG. 8B, the third height h3 and the fourth height h4 may be equal to each other.

Alternatively, as illustrated in FIG. 8C, the third height h3 may be less than the fourth height h4.

As described above, the protrusions of the bracket may be designed to have various heights based on the size and thickness of the illumination unit.

FIGS. 9A to 9C are sectional views illustrating heights of the protrusions of the bracket according to a second embodiment.

As illustrated in FIGS. 9A to 9C, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The bracket 500 may include the first protrusion 505 and the second protrusion 506 which protrude from the first body portion 502, and the third protrusion 507 and the fourth protrusion 508 which protrude from the second body portion 503.

The first protrusion 505 of the bracket 500 may protrude from the first body portion 502 by a first height h1, and the third protrusion 507 of the bracket 500 may protrude from the second body portion 503 by a third height h3.

In this case, as illustrated in FIG. 9A, the first height h1 may be greater than the third height h3.

As occasion demands, as illustrated in FIG. 9B, the first height h1 and the third height h3 may be equal to each other.

Alternatively, as illustrated in FIG. 9C, the first height h1 may be less than the third height h3.

The second protrusion 506 of the bracket 500 may protrude from the first body portion 502 by a second height h2, and the fourth protrusion 508 of the bracket 500 may protrude from the second body portion 503 by a fourth height h4.

In this case, as illustrated in FIG. 9A, the second height h2 may be greater than the fourth height h4.

As occasion demands, as illustrated in FIG. 9B, the second height h2 and the fourth height h4 may be equal to each other.

Alternatively, as illustrated in FIG. 9C, the second height h2 may be less than the fourth height h4.

As described above, the protrusions of the bracket may be designed to have various heights based on the size and thickness of the illumination unit.

FIG. 10 is a sectional view illustrating heights of the protrusions of the bracket according to a third embodiment.

As illustrated in FIG. 10, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The bracket 500 may include the first protrusion 505 and the second protrusion 506 which protrude from the first body portion 502, and the third protrusion 507 and the fourth protrusion 508 which protrude from the second body portion 503.

The bracket 100 may include a fifth protrusion 509 placed between the first and second protrusions 505 and 506, and a sixth protrusion 510 placed between the third and fourth protrusions 507 and 508.

The fifth protrusion 509 of the bracket 500 may protrude from the first body portion 502 in the same direction as the first protrusion 505, and the sixth protrusion 510 of the bracket 500 may protrude from the second body portion 503 in the same direction as the third protrusion 507.

The first protrusion 505 of the bracket 500 may protrude from the first body portion 502 by a first height h1, the second protrusion 506 of the bracket 500 may protrude from the first body portion 502 by a second height h2, and the fifth protrusion 509 of the bracket 500 may protrude from the first body portion 502 by a fifth height h5.

In this case, as illustrated in FIG. 10, the fifth height h5 may be less than the first height h1 and the second height h2.

As occasion demands, the fifth height h5 may be equal to the first height h1 or the second height h2.

The third protrusion 507 of the bracket 500 may protrude from the second body portion 503 by a third height h3, the fourth protrusion 508 of the bracket 500 may protrude from the second body portion 503 by a fourth height h4, and the sixth protrusion 510 of the bracket 500 may protrude from the second body portion 503 by a sixth height h6.

In this case, as illustrated in FIG. 10, the sixth height h6 may be less than the third height h3 and the fourth height h4.

As occasion demands, the sixth height h6 may be equal to the third height h3 or the fourth height h4.

As described above, the protrusions of the bracket may be designed to have various heights based on the size and thickness of the illumination unit.

FIGS. 11A and 11B are perspective views illustrating the bracket. FIG. 11A is a top perspective view, and FIG. 11B is a bottom perspective view.

As illustrated in FIGS. 11A and 11B, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The bracket 500 may include the first protrusion 505 and the second protrusion 506 which protrude from the first body portion 502, and the third protrusion 507 and the fourth protrusion 508 which protrude from the second body portion 503.

The bracket 100 may include the fifth protrusion 509 placed between the first and second protrusions 505 and 506, and the sixth protrusion 510 placed between the third and fourth protrusions 507 and 508.

The bracket 500 having the aforementioned configuration may be connected to the bottom covers and the cover members of the first illumination unit (80, see FIG. 1A) and the second illumination unit (90, see FIG. 1A).

To this end, first and second fastening holes 514 and 515 may be formed in the connecting portion 504 of the bracket 500 to enable connection between the bracket 500 and the cover members of the illumination units, and third fastening holes 518 may be formed in the second protrusion 506 and the fourth protrusion 508 of the bracket 500 to enable connection between the bracket 500 and the bottom covers of the illumination units.

FIGS. 12A to 12C are sectional views illustrating arrangement of the power source unit according to a first embodiment.

As illustrated in FIGS. 12A to 12C, the bracket 500 may be placed between the first illumination unit (80, see FIG. 1A) and the second illumination unit (90, see FIG. 1A), and may connect the first illumination unit (80, see FIG. 1A) and the second illumination unit (90, see FIG. 1A) to each other.

The bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

In this case, the connecting portion 504 of the bracket 500 may have a first distance d1 from the first end of the first body portion 502 or the second body portion 503, and may have a second distance d2 from the second end of the first body portion 502 or the second body portion 503. Here, the second distance d2 may be greater than the first distance d1.

That is, the first distance d1 of the bracket 500 is a distance from an upper surface 504a of the connecting portion 504 of the bracket 500 to the first end of the first body portion 502 or the second body portion 503, and the second distance d2 of the bracket 500 is a distance from a lower surface 504b of the connecting portion 504 of the bracket 500 to the second end of the first body portion 502 or the second body portion 503.

A ratio of the first distance d1 to the second distance d2 of the bracket 500 may be in a range of about 1:1.1 to 1:30.

For example, the second distance d2 of the bracket 500 may be in a range of about 20 mm to 80 mm.

The reason for arranging the connecting portion 504 as described above is because the power source unit 700 is arranged below the connecting portion 504 of the bracket 500.

That is, when the second distance d2 is greater than the first distance d1, a space for installation of the power source unit 700 may be acquired.

Arranging the power source unit 700 below the connecting portion 504 of the bracket 500 has the effect of reducing a thickness of the entire illumination unit.

The power source unit 700 may be installed to the lower surface 504b of the connecting portion 504 of the bracket 500. The entire power source unit 700, as illustrated in FIG.

12A, may be positioned within a range of the second distance d2 from the lower surface 504b of the connecting portion 504 to the second end of the first body portion 502 or the second body portion 503.

That is, a lower surface 700a of the power source unit 700, as illustrated in FIG. 12A, may be located within a range of the second distance d2 from the lower surface 504b of the connecting portion 504 to the second end of the first body portion 502 or the second body portion 503.

As occasion demands, the entire power source unit 700, as illustrated in FIG. 12B, may be positioned within a range of the second distance d2 from the lower surface 504b of the connecting portion 504 to the second end of the first body portion 502 or the second body portion 503, and the lower surface 700a of the power source unit 700 may be located at the second end of the first body portion 502 or the second body portion 503.

Alternatively, as illustrated in FIG. 12C, a portion of the power source unit 700 may be positioned within a range of the second distance d2 from the lower surface 504b of the connecting portion 504 to the second end of the first body portion 502 or the second body portion 503, and the remaining portion of the power source unit 700 may protrude outward from the bracket 500.

The lower surface 700a of the power source unit 700 may be located at the outside of the bracket 500 beyond the second end of the first body portion 502 or the second body portion 503.

As described above, the power source unit 700 may be designed to have various heights based on the size and thickness of the bracket.

FIGS. 13A to 13C are sectional views illustrating arrangement of the power source unit according to a second embodiment.

As illustrated in FIGS. 13A to 13C, the bracket 500 may be placed between the first illumination unit (80, see FIG. 1A) and the second illumination unit (90, see FIG. 1A), to connect the first illumination unit (80, see FIG. 1A) and the second illumination unit (90, see FIG. 1A) to each other.

The bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The power source unit 700 may be installed to the lower surface 504b of the connecting portion 504 of the bracket 500.

That is, the power source unit 700 may be located between the first body portion 502 and the second body portion 503 of the bracket 500, and may be fastened to the connecting portion 504 of the bracket 500.

The power source unit 700 may wholly or partially be located within a distance between the first body portion 502 and the second body portion 503 of the bracket 500. As occasion demands, the power source unit 700 may be exposed outward beyond the distance between the first body portion 502 and the second body portion 503 of the bracket 500.

The power source unit 700 may have a third distance d3 from the first body portion 502 of the bracket 500, and may have a fourth distance d4 from the second body portion 503 of the bracket 500.

More specifically, the third distance d3 of the power source unit 700 may be a distance between a lateral surface of the first body portion 502 and one lateral surface of the power source unit 700, and the fourth distance d4 of the power source unit 700 may be a distance between a lateral surface of the second body portion 503 and the other lateral surface of the power source unit 700.

For example, the third distance d3 or the fourth distance d4 of the power source unit 700 may be in a range of about 1 mm to 40 mm.

As described above, the reason for providing a predetermined distance between the first or second body portion 502 or 503 of the bracket 500 and the power source unit 700 is to easily radiate heat generated from the power source unit 700.

The third distance d3 and the fourth distance d4 of the power source unit 700, as illustrated in FIG. 13A, may be equal to each other.

As occasion demands, the third distance d3 of the power source unit 700, as illustrated in FIG. 13B, may be greater than the fourth distance d4 of the power source unit 700.

Alternatively, the third distance d3 of the power source unit 700, as illustrated in FIG. 13C, may be less than the fourth distance d4 of the power source unit 700.

As described above, the power source unit 700 may be designed to have various distances from the bracket 500 based on the size and thickness of the bracket.

Moreover, arranging the power source unit 700 below the connecting portion 504 of the bracket 500 has the effect of reducing a thickness of the entire illumination unit.

FIG. 14 is a sectional view illustrating the connecting portion of the bracket.

As illustrated in FIG. 14, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The upper surface 504a of the connecting portion 504 of the bracket 500 may be provided with a coupling recess, such that coupling bosses of the first and second cover members 710 and 720 may be inserted into the coupling recess formed in the connecting portion 504 of the bracket 500.

Also, the lower surface 504b of the connecting portion 504 of the bracket 500 may be provided with a coupling bump, such that the coupling bump of the connecting portion 504 of the bracket 500 may be inserted into a coupling recess (not shown) formed in the power source unit 700.

In this case, the coupling bump of the connecting portion 504 of the bracket 500 may be arranged opposite to the coupling recess of the connecting portion 504 of the bracket 500.

FIGS. 15A to 15C are sectional views illustrating a coupling region of the connecting portion of the bracket.

As illustrated in FIGS. 15A and 15B, the bracket 500 may consist of the first body portion 502, the second body portion 503, and the connecting portion 504.

The connecting portion 504 of the bracket 500 may be placed between the first body portion 502 and the second body portion 503 of the bracket 500, to connect the first body portion 502 and the second body portion 503 to each other.

The upper surface 504a of the connecting portion 504 of the bracket 500 may be provided with a coupling recess 562. The coupling recess 562 may serve to couple the connecting portion 504 of the bracket 500 to the first cover member (710, see FIG. 2) of the first illumination unit (80, see FIG. 1A) and the second cover member (720, see FIG. 2) of the second illumination unit (90, see FIG. 1A).

Also, the lower surface 504b of the connecting portion 504 of the bracket 500 may be provided with a coupling bump 564. The coupling bump 564 may be inserted into the power source unit (700, see FIG. 2).

As described above, the connecting portion 504 of the bracket 500, as illustrated in FIG. 15A, may be provided at the upper surface 504a thereof with the coupling recess 562, but may not be provided at the lower surface 504b thereof with the coupling bump 564.

Alternatively, the connecting portion 504 of the bracket 500, as illustrated in FIG. 15B, may not be provided at the upper surface 504a thereof with the coupling recess 562, but may be provided at the lower surface 504b thereof with the coupling bump 564.

As illustrated in FIG. 15C, the connecting portion 504 of the bracket 500 may be provided at the upper surface 504a thereof with the coupling recess 562 and at the lower surface 504b thereof with the coupling bump 564.

In this case, the coupling bump 564 formed at the connecting portion 504 of the bracket 500 may be located opposite to the coupling recess 562 formed in the connecting portion 504 of the bracket 500.

FIGS. 16A and 16B are perspective views illustrating coupling between the bracket and the first and second illumination units. FIG. 16A illustrates a state before coupling, and FIG. 16B illustrates a state after coupling.

As illustrated in FIGS. 16A and 16B, the bracket 500 may be a double-sided bracket, and may be placed between the first and second illumination units 80 and 90.

The first light source module (110, see FIG. 2) may be placed on the first body portion (502, see FIG. 5) of the bracket 500, and the second light source module (120, see FIG. 2) may be placed on the second body portion (503, see FIG. 5) of the bracket 500.

The first bottom cover (410, see FIG. 2) of the first illumination unit 80 may be coupled to the second protrusion (506, see FIG. 5) of the bracket 500, and the second bottom cover (420, see FIG. 2) of the second illumination unit 90 may be coupled to the fourth protrusion (508, see FIG. 5) of the bracket 500.

FIG. 17 is an enlarged sectional view illustrating the region D of FIG. 16B.

As illustrated in FIG. 17, the bracket 500 may consist of the first body portion 502, the second body portion 503, and the connecting portion 504.

The bracket 500 may include the first protrusion 505 and the second protrusion 506 which protrude from the first body portion 502, and the third protrusion 507 and the fourth protrusion 508 which protrude from the second body portion 503.

The first protrusion 505 may protrude from the first end of the first body portion 502 in an opposite direction of the connecting portion 504, and the second protrusion 505 may protrude from the second end of the first body portion 502 in an opposite direction of the connecting portion 504.

The third protrusion 507 may protrude from the first end of the second body portion 503 in an opposite direction of the connecting portion 504, and the fourth protrusion 508 may protrude from the second end of the second body portion 503 in an opposite direction of the connecting portion 504.

The first light source module 110 may be placed on the first body portion 502 of the bracket 500, and the second light source module 120 may be placed on the second body portion 503 of the bracket 500.

The connecting portion 504 of the bracket 500 may be located between the first body portion 502 and the second body portion 503 of the bracket 500, to connect the first body portion 502 and the second body portion 503 to each other.

The first reflector of the first illumination unit (80, see FIG. 1A) may be placed on the lower surface 505b of the first protrusion 505 of the bracket 500, and the first optical member may be placed on the upper surface 505a of the first protrusion 505 of the bracket 500.

The second protrusion 506 of the bracket 500 may come into contact with the first bottom cover 410 of the first illumination unit (80, see FIG. 1A).

The second protrusion 506 of the bracket 500 may be coupled to the first bottom cover 410 by the first fastening screw 591.

The third reflector of the second illumination unit (90, see FIG. 1A) may be placed on the lower surface 507b of the third protrusion 507 of the bracket 500, and the second optical member may be placed on the upper surface 507a of the third protrusion 507 of the bracket 500.

The fourth protrusion 508 of the bracket 500 may come into contact with the second bottom cover 420 of the second illumination unit (90, see FIG. 1A).

The fourth protrusion 508 of the bracket 500 may be coupled to the second bottom cover 420 by the second fastening screw 592.

As described above, the bracket 500 of the aforementioned embodiment may realize simplified coupling between the first illumination unit and the second illumination unit, and may be beneficial to fabrication of a large-area illumination unit.

FIG. 18 is a sectional view illustrating the bracket to which double-edge type illumination units are fastened, FIG. 19 is a sectional view illustrating the bracket to which single-edge type illumination units are fastened, and FIG. 20 is a sectional view illustrating the bracket to which a single-edge type illumination unit and a double-edge type illumination unit are fastened.

As illustrated in FIG. 18, the double-edge type first illumination unit 80 and the double-edge type second illumination unit 90 may be provided at both sides of the bracket 500.

In the first illumination unit 80, the second reflector 310 may be placed on the first bottom cover 410, the first light source module 110 may be located at one side of the first bottom cover 410, and the third light source module 130 may be located at the other side of the first bottom cover 410.

In this case, the first light source module 110 may be installed to the bracket 500, and the third light source module 130 may be installed to the first heat bar 540.

The first optical member 610 may be spaced apart from the second reflector 310 by a predetermined distance. As such, an air guide may be defined in a space between the second reflector 310 and the first optical member 610.

In the second illumination unit 90, the fourth reflector 320 may be placed on the second bottom cover 420, the second light source module 120 may be located at one side of the second bottom cover 420, and the fourth light source module 140 may be located at the other side of the second bottom cover 420.

In this case, the second light source module 120 may be installed to the bracket 500, and the fourth light source module 140 may be installed to the second heat bar 560.

The second optical member 620 may be spaced apart from the fourth reflector 320 by a predetermined distance. As such, an air guide may be defined in a space between the fourth reflector 320 and the second optical member 620.

As illustrated in FIG. 19, the single-edge type first illumination unit 80 and the single-edge type second illumination unit 90 may be provided respectively at both sides of the bracket 500.

In the first illumination unit 80, the first light source module 110 may be located at one side of the first bottom cover 410 on which the second reflector 310 is placed.

In this case, the first light source module 110 may be installed to the bracket 500.

The first optical member 610 may be spaced apart from the second reflector 310 by a predetermined distance. As such, an air guide may be defined in a space between the second reflector 310 and the first optical member 610.

In the second illumination unit 90, the second light source module 120 may be located at one side of the second bottom cover 420 on which the fourth reflector 320 is placed.

In this case, the second light source module 120 may be installed to the bracket 500.

The second optical member 620 may be spaced apart from the fourth reflector 320 by a predetermined distance. As such, an air guide may be defined in a space between the fourth reflector 320 and the second optical member 620.

As illustrated in FIG. 20, the single-edge type first illumination unit 80 may be provided at one side of the bracket 500 and the double-edge type second illumination unit 90 may be provided at the other side of the bracket 500.

In the first illumination unit 80, the first light source module 110 may be located at one side of the first bottom cover 410 on which the second reflector 310 is placed.

In this case, the first light source module 110 may be installed to the bracket 500.

The first optical member 610 may be spaced apart from the second reflector 310 by a predetermined distance. As such, an air guide may be defined in a space between the second reflector 310 and the first optical member 610.

In the second illumination unit 90, the fourth reflector 320 may be placed on the second bottom cover 420, the second light source module 120 may be located at one side of the second bottom cover 420, and the fourth light source module 140 may be located at the other side of the second bottom cover 420.

In this case, the second light source module 120 may be installed to the bracket 500, and the fourth light source module 140 may be installed to the second heat bar 560.

The second optical member 620 may be spaced apart from the fourth reflector 320 by a predetermined distance. As such, an air guide may be defined in a space between the fourth reflector 320 and the second optical member 620.

FIG. 21 is a bottom perspective view of the bracket illustrating the power source unit placed on the lower surface of the bracket, and FIG. 22 is a perspective view illustrating the cover member of the power source unit.

As illustrated in FIGS. 21 and 22, the bracket 500 may be a double-sided bracket, and may be located between the first and second illumination units 80 and 90 to connect the first and second illumination units 80 and 90

The power source unit 700 to supply power to the first and second illumination units 80 and 90 and the fourth cover member 740 may be arranged below the bracket 500.

Although the entire bracket 500 may serve as a conductor, only a portion of the bracket 500 may serve as a conductor as occasion demands.

The reason for forming the bracket 500 of a conductive material is to prevent damage to the power source unit 700 due to static electricity.

Arranging the power source unit 700 below the bracket 500 has the effect of reducing a thickness of the entire illumination unit.

The bracket 500 formed of a conductive material may prevent damage to the power source unit 700 due to static electricity.

The fourth cover member 740 may be a conductor. However, as occasion demands, a portion of the fourth cover member 740 may be a non-conductor.

FIGS. 23A to 23D are explanatory views illustrating an arrangement relationship between the first light source module and the first and second reflectors.

FIG. 23A is a view illustrating the first light source module 110 spaced apart from the first reflector 210 and the second reflector 310 by predetermined distances. FIG. 23B illustrates the first light source module 110 coming into contact with both the first reflector 210 and the second reflector 310. FIG. 23C illustrates the first light source module 110 coming into contact with the first reflector 210 while being spaced apart from the second reflector 310 by a predetermined distance, and FIG. 23D illustrates the first light source module 110 spaced apart from the first reflector 210 by a predetermined distance while coming into contact with the second reflector 310.

As illustrated in FIG. 23A, the first light source module 110 may be spaced apart from the first reflector 210 by a first distance d31 and may be spaced apart from the second reflector 310 by a second distance d32.

Here, the first distance d31 and the second distance d32 may be equal to each other, or may differ from each other.

For example, the first distance d31 may be less than the second distance d32.

This is because a hot spot phenomenon may occur if the first distance d31 is greater than the second distance d32.

As illustrated in FIG. 23B, the first light source module 110 may come into contact with both the first reflector 210 and the second reflector 310.

When the first light source module 110 comes into contact with both the first reflector 210 and the second reflector 310, it is possible to prevent a hot spot phenomenon, to transmit light more distantly from the first light source module 110, and to reduce a thickness of the entire illumination unit.

As illustrated in FIG. 23C, the first light source module 110 may come into contact with the first reflector 210 and may be spaced apart from the second reflector 310 by a distance d.

When the first light source module 110 comes into contact with the first reflector 210, it is possible to prevent a hot spot phenomenon and to transmit light more distantly from the first light source module 110.

As illustrated in FIG. 23D, the first light source module 110 may come into contact with the second reflector 310 and may be spaced apart from the first reflector 210 by a distance d.

Although the arrangement relationship between the first light source module 110 and the first and second reflectors 210 and 310 of the first illumination unit has been described above by way of example, the above description is applicable to an arrangement relationship between the second light source module 120 and the third and fourth reflectors 220 and 320 of the second illumination unit.

FIG. 24A to 24D are views illustrating the first reflector having an inclined surface. FIG. 24A illustrates a flat inclined surface, and FIGS. 24B, 24C and 24D illustrate a curved inclined surface.

As illustrated in FIGS. 24A to 24D, one surface of the first reflector 210 facing the second reflector 310 may be an inclined surface having a predetermined inclination angle with respect to the other surface of the first reflector 210.

Here, the angle θ of the inclined surface may be in a range of 1~85 degrees with respect to a horizontal plane parallel to the other surface of the first reflector 210.

A thickness of the first reflector 210 may gradually decrease or increase with increasing distance from the first light source module 110.

More specifically, a thickness t1 of a region of the first reflector 210 close to the first light source module 110 may differ from a thickness t2 of a region of the first reflector 210 distant from the first light source module 110. As illustrated in FIGS. 24A and 24B, the thickness t1 of the region of the first reflector 210 close to the first light source module 110 may be greater than the thickness t2 of the region of the first reflector 210 distant from the first light source module 110.

As occasion demands, as illustrated in FIGS. 24C and 24D, the thickness t1 of the region of the first reflector 210 close to the first light source module 110 may be less than the thickness t2 of the region of the first reflector 210 distant from the first light source module 110.

Additionally, as illustrated in FIG. 24D, the first reflector 210 may include not only an inclined surface, but also a flat surface.

More specifically, the region of the first reflector 210 close to the first light source module 110 may include an inclined surface, and the region of the first reflector 210 distant from the first light source module 110 may include a flat surface.

Here, a length L1 of the inclined surface and a length L2 of the flat surface may be equal to each other, or may differ from each other, as occasion demands.

A reflective pattern may be formed on a surface of the first reflector 210.

Although the shape of the first reflector 210 of the first illumination unit has been described above by way of example, the above description is equally applicable to the shape of the third reflector 220 of the second illumination unit.

FIGS. 25A to 25D are views illustrating the first reflector having a reflective pattern.

FIG. 25A illustrates a saw-toothed reflective pattern 211, each tooth of which may have a flat surface. FIGS. 25B and 25C illustrate a saw-toothed reflective pattern 211, each tooth of which may have a curved surface.

Here, the reflective pattern 221 illustrated in FIG. 25B includes saw-teeth, each having a concavely curved surface, whereas the reflective pattern 211 illustrated in FIG. 25C includes saw-teeth, each having a convexly curved surface.

As occasion demands, as illustrated in FIG. 25D, in the case of the saw-toothed reflective pattern 211, the size of teeth may gradually increase with increasing distance from a fixed end of the first reflector 210.

The reason for providing the reflective pattern 221 on the first reflector 200 may achieve higher reflectivity and uniform diffusion of light.

Accordingly, various sizes of the reflective pattern 221 may be formed at a corresponding region based on luminance distribution of the entire backlight unit.

Although the reflective pattern of the first reflector 210 of the first illumination unit has been described above by way of example, the above description is equally applicable to a reflective pattern of the third reflector 220 of the second illumination unit.

FIG. 26 is a sectional view illustrating a reflective surface of the second reflector.

As illustrated in FIG. 26, the first illumination unit may include the first and third light source modules 110 and 130, the first, second and fifth reflectors 210, 310 and 230, and the first optical member 610.

The second reflector 310 may include a specular-reflection region 300a and a diffuse-reflection region 300b. The diffuse-reflection region 300b may include a first diffuse-reflection region 300b1 and a second diffuse-reflection region 300b2.

The specular-reflection region 300a may perform specular-reflection of incident light, and the diffuse-reflection region 300b may perform diffuse-reflection of incident light. Reflectivity of the specular-reflection region 300a and the diffuse-reflection region 300b may be in a range of about 50% to 99.99%.

The first and second diffuse-reflection regions 300b1 and 300b2 may include a first reflective pattern that reflects incident light via Lambertian distribution, and a second reflective pattern that reflects incident light via Gaussian distribution.

In the first diffuse-reflection region 300b1, a size of the first reflective pattern may be less than a size of the second reflective pattern. In the second diffuse-reflection region 300b2, a size of the first reflective pattern may be greater than a size of the second reflective pattern.

An area ratio of the first diffuse-reflection region 300b1 to the second diffuse-reflection region 300b2 may be in a range of about 1:1 to 1:5.

In this case, an area ratio of the specular-reflection region 300a to the first diffuse-reflection region 300b1 may be in a range of about 1:1 to 1:4, and an area ratio of the specular-reflection region 300a to the second diffuse-reflection region 300b2 may be in a range of about 1:1 to 1:20.

The reason for defining the area ratio of the specular-reflection region 300a to the first or second diffuse-reflection region 300b1 or 300b2 of the second reflector 310 is to reduce a luminance difference between a region of the second reflector 310 close to the first light source module 110 and a region of the second reflector 310 distant from the first light source module 110.

That is, uniform luminance may be accomplished by appropriately adjusting the area ratio of the specular-reflection region 300a to the first or second diffuse-reflection region 300b1 or 300b2 of the second reflector 310.

The first diffuse-reflection region 300b1 may be located between the specular-reflection region 300a and the second diffuse-reflection region 300b2.

More specifically, the specular-reflection region 300a of the second reflector 310 may be located close to the first light source module 110, and the second diffuse-reflection region 300b2 of the second reflector 310 may be located distant from the first light source module 110. The first diffuse-reflection region 300b1 of the second reflector 310 may be located between the specular-reflection region 300a and the second diffuse-reflection region 300b2.

With this arrangement, the specular-reflection region 300a of the second reflector 310 located close to the first light source module 110 serves to reflect light emitted from the first light source module 110 to a central region of the second reflector 310, and the diffuse-reflection region 300b of the second reflector 310 located in a central region of the second reflector 310 serves to diffuse incident light.

The first optical member 610 may be spaced apart from the second reflector 310 by a predetermined distance. As such, an air guide may be defined in a space between the second reflector 310 and the first optical member 610.

The first optical member 610 may include a roughened pattern 611 formed on a surface thereof.

Although the reflective surface of the second reflector 310 of the first illumination unit has been described above by way of example, the above description is equally applicable to a reflective surface of the fourth reflector 320 of the second illumination unit.

FIG. 27 is a perspective view illustrating the first optical member.

As illustrated in FIG. 27, the first optical member 610 may have a multilayer form. The roughened pattern 611 may be an uppermost layer or any one layer of the first optical member 610.

As occasion demands, the first optical member 610 may be formed of at least one sheet. More specifically, the optical member 600 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

As described above, the first optical member 610 serves to diffuse light emitted from the first and third light source modules 110 and 130. The roughened pattern 611 formed on an upper surface of the first optical member 610 may serve to increase diffusion effects.

The roughened pattern 611 may have a stripe shape extending along the first and third light source modules 110 and 130.

In this case, the roughened pattern 611 may include ridges formed on the surface of the first optical member 610. The respective ridges may have a first face and a second face facing each other, and an angle between the first face and the second face may be an acute angle or an obtuse angle.

As occasion demands, the first optical member 610 may be formed of at least one sheet. More specifically, the first optical member 610 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

As described above, the aforementioned embodiments may employ the double-sided bracket to which two illumination units are fastened, which enables simplified fabrication of a large-area illumination unit.

As such, through provision of the reflector having a partial inclined surface for an air guide instead of a light guide plate, the aforementioned embodiments may achieve low weight and manufacturing costs and uniform luminance.

Accordingly, the illumination unit may achieve enhanced reliability and economical efficiency and may be suitable for a wide indoor space.

In addition, a display apparatus, an indicator apparatus, and an illumination system, which employ the double-sided bracket and the first and second illumination units according to the above described embodiments, may be realized. For example, an illumination system may include a lamp, and a street lamp.

The illumination system may be used as an illumination lamp that generates light using a group of a plurality of LEDs. In particular, the illumination system may serve as a built-in lamp (downlight) which is embedded in the ceiling or wall of a building such that an opening of a shade is exposed.

FIG. 28 is a view illustrating a display module having an illumination unit according to an embodiment.

As illustrated in FIG. 28, the display module 20 may include a display panel 800 and an illumination unit 790.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

An upper polarizer 830 and a lower polarizer 840 may be disposed at upper and lower sides of the display panel 800. More specifically, the upper polarizer 830 may be disposed on an upper surface of the color filter substrate 810, and the lower polarizer 840 may be disposed beneath a lower surface of the TFT substrate 820.

Although not illustrated, a gate and data drive unit may be provided at a lateral surface of the display panel 800 and may generate a drive signal to drive the panel 800.

FIGS. 29 and 30 are views illustrating a display apparatus according to an embodiment.

Referring to FIG. 29, the display apparatus 1 may include the display module 20, a front cover 30 and a back cover 35 to surround the display module 20, a drive unit 55 provided at the back cover 35, and a drive unit cover 40 to surround the drive unit 55.

The front cover 30 may include a transparent front panel (not shown) to transmit light. The front panel serves to protect the display module 20 spaced apart therefrom by a predetermined distance and to transmit light emitted from the display module 20, allowing an image displayed on the display module 20 to be seen from the outside.

The back cover 35 may be coupled to the front cover 30 to protect the display module 20.

The drive unit 55 may be placed on a surface of the back cover 35.

The drive unit 55 may include a drive controller 55*a*, a main board 55*b* and a power supply board 55*c*.

The drive controller 55*a* may be a timing controller. The drive controller 55*a* serves to adjust an operation timing of each driver IC of the display module 20. The main board 55*b* may serve to transmit V-sync, H-sync and R, G and B resolution signals to the timing controller. The power supply board 55*c* supplies power to the display module 20.

The drive unit 55 may be attached to the back cover 35 and may be enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 30, the drive controller 55*a* of the drive unit 55 may be provided at the back cover 35, whereas the main board 55*b* and the power supply board 55*c* may be provided in the stand 60.

The drive unit cover 40 may be configured to enclose only the drive unit 55 provided at the back cover 35.

Although the present embodiment illustrates the main board 55*b* and the power supply board 55*c* as being provided separately, they may be integrated with each other, and the disclosure is not limited thereto.

In other embodiments, a display apparatus, an indicator apparatus, and an illumination system, which include the double-sided bracket and the first and second illumination units as described in the above embodiments, may be realized. For example, the illumination system may include a lamp or a street lamp.

The illumination system may be used as an illumination lamp that generates light using a group of a plurality of LEDs. In particular, the illumination system may serve as a built-in lamp (downlight) which is embedded in the ceiling or wall of a building such that an opening of a shade is exposed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination unit comprising:
a first illumination unit including a first light source module, a first optical member, a first cover member and a first bottom cover, the first light source module including a board and a light source on the board;
a second illumination unit including a second light source module, a second optical member, a second cover member and a second bottom cover, the second light source module including a board and a light source on the board;
a power supply unit to supply power to the first and second illumination unit; and
a bracket located between the first and second illumination units,
wherein the bracket includes:
a first body portion having a first surface between a first end of the first body portion and a second end of the first body portion, and the first light source module is directly attached to the first body portion;
a second body portion having a second surface between a first end of the second body portion and a second end of the second body portion, the second surface of the second body portion to face the first surface of the first body portion, and the second light source module is directly attached to the second body portion; and
a connecting portion located between the first body portion and the second body portion, and
wherein the connecting portion is connected to the first surface of the first body portion between the first and second ends of the first body portion, and the connecting portion is connected to the second surface of the second body portion between the first and second ends of the second body portion, and
wherein the connecting portion includes an upper surface and a lower surface opposite to each other, and
wherein a coupling recess is formed at the upper surface of the connecting portion, wherein the first cover member includes a first coupling boss, and the second cover member includes a second coupling boss, the first coupling boss being inserted into the coupling recess, and the second coupling boss being inserted into the coupling recess, and a third cover member is arranged above the bracket such that the first coupling boss of the first cover member is between the coupling recess and the third cover member, and such that the second coupling boss of the second cover member is between the coupling recess and the third cover member, and wherein a coupling bump is at the lower surface of the connecting portion, the coupling bump is arranged on the connecting portion opposite to the coupling recess, and wherein the power source unit is coupled to the coupling bump, wherein a fourth cover member is arranged below the bracket such that the power source unit is provided between the coupling bump and the fourth cover member, wherein the first optical member includes a first diffusion sheet to diffuse light from the first light source module, and the first optical member is provided between the first cover member and the first bottom cover, and wherein the second optical member includes a second diffusion sheet to diffuse light from the second light source module, and the second optical member is provided between the second cover member and the second bottom cover, wherein the bracket includes:
a first protrusion protruding in a first direction from the first end of the first body portion;
a second protrusion protruding in the first direction from the second end of the first body portion;
a third protrusion protruding in a second direction from the first end of the second body portion, wherein the second direction is opposite to the first direction;
a fourth protrusion protruding in the second direction from the second end of the second body portion;
a fifth protrusion located between the first and second protrusions, the fifth protrusion protruding from the first body portion in the first direction; and
a sixth protrusion located between the third and fourth protrusions, the sixth protrusion protruding from the second body portion in the second direction,
wherein the first protrusion contacts a first reflector of the first illumination unit, the second protrusion contacts the first bottom cover of the first illumination unit, the third protrusion contacts a second reflector of the second illumination unit, and the fourth protrusion contacts the second bottom cover of the second illumination unit.

2. The illumination unit according to claim 1, wherein the connecting portion of the bracket has a first thickness, the first body portion has a second thickness, and the first thickness is greater than the second thickness.

3. The illumination unit according to claim 2, wherein a ratio of the first thickness to the second thickness is in a range of 1.01:1 to 5:1.

4. The illumination unit according to claim 1,
wherein the first protrusion protrudes in the first direction from the first body portion by a first length, the second protrusion protrudes in the first direction from the first body portion by a second length, and the first length is greater than the second length.

5. The illumination unit according to claim 1, wherein the third protrusion protrudes in the second direction from the second body portion by a first length, the fourth protrusion protrudes in the second direction from the second body portion by a second length, and the first length is greater than the second length.

6. The illumination unit according to claim 1,
wherein the first protrusion protrudes in the first direction from the first body portion by a first length, the second protrusion protrudes in the first direction from the first body portion by a second length, the fifth protrusion protrudes in the first direction from the first body portion by a third length, and the third length is less than the first length and the second length.

7. The illumination unit according to claim 1, wherein the third protrusion protrudes in the second direction from the second body portion by a first length, the fourth protrusion protrudes in the second direction from the second body portion by a second length, the sixth protrusion protrudes in the second direction from the second body portion by a third length, and the third length is less than the first length and the second length.

8. The illumination unit according to claim 7, wherein the connecting portion has a first thickness at a first portion of the connecting portion, and the connecting portion has a second thickness at a second portion of the connecting portion.

9. The illumination unit according to claim 1, wherein the first illumination unit includes:
   the first reflector and a third reflector;
   the first light source module located between the first reflector and the third reflector; and
   the first optical member spaced apart from the third reflector by a predetermined distance, and
   wherein an air guide is defined in a space between the third reflector and the first optical member.

10. The illumination unit according to claim 9, wherein the second illumination unit includes:
    the second reflector and a fourth reflector;
    the second light source module located between the second reflector and the fourth reflector; and
    the second optical member spaced apart from the fourth reflector by a predetermined distance, and
    wherein an air guide is defined in a space between the fourth reflector and the second optical member.

11. The illumination unit according to claim 1, wherein the coupling bump is inserted into the power source unit.

12. The illumination unit according to claim 1, wherein the first reflector has a flat surface, and includes a saw-toothed pattern on the flat surface of the first reflector, wherein the saw-toothed pattern includes a plurality of teeth.

13. The illumination unit according to claim 12, wherein each of the plurality of teeth has a curved surface.

14. The illumination unit according to claim 12, wherein each of the plurality of teeth has a conversely curved surface.

15. The illumination unit according to claim 12, wherein a size of teeth increases with increasing distance from a first end of the first reflector to a second end of the first reflector.

16. An illumination unit comprising:
    a first illumination unit including a first light source module, a first optical member, a first cover member and a first bottom cover, the first light source module including a board and a light source on the board;
    a second illumination unit including a second light source module, a second optical member, a second cover member and a third bottom cover, the second light source module including a board and a light source on the board;
    a power supply unit to supply power to the first and second illumination units; and
    a bracket located between the first and second illumination units to connect the first and second illumination units to each other,
    wherein the bracket includes:
    a first body portion to extend from a first end to a second end of the first body portion, and the first light source module is directly attached to the first body portion;
    a second body portion to extend from a third end to a fourth end of the second body portion, and the second light source module is directly attached to the second body portion; and
    a connecting portion located between the first body portion and the second body portion, and
    wherein the connecting portion is connected to a first point of the first body portion between the first end and the second end of the first body portion,
    wherein the connecting portion is connected to a second point of the second body portion between the third end and the fourth end of the second body portion, wherein a first distance from the first end of the first body portion to the first point is less than a second distance from the first point to the second end of the first body portion, and
    wherein the power source unit is provided between the first body portion and the second body portion of the bracket to supply power to the first and second light source modules, and
    wherein the power source unit is coupled to the connecting portion of the bracket, and
    wherein the connecting portion includes an upper surface and a lower surface opposite to each other, and
    wherein a coupling recess is at the upper surface of the connecting portion, wherein the first cover member includes a first coupling boss, and the second cover member includes a second coupling boss, wherein the first coupling boss being inserted into the coupling recess, and the second coupling boss being inserted into the coupling recess, and a third cover member is arranged above the bracket such that the first coupling boss of the first cover member is between the coupling recess and the third cover member, and such that the second coupling boss of the second cover member is between the coupling recess and the third cover member,
    wherein a coupling bump is provided at the lower surface of the connecting portion, such that the coupling bump is arranged at the connecting portion opposite to the coupling recess, and
    wherein the power source unit is coupled to the coupling bump,
    wherein a fourth cover member is arranged below the bracket such that the power source unit is provided between the coupling bump and the fourth cover member,
    wherein the first optical member includes a first diffusion sheet to diffuse light from the first light source module, and the first optical member is provided between the first cover member and the first bottom cover, and
    wherein the second optical member includes a second diffusion sheet to diffuse light from the second light source module, and the second optical member is provided between the second cover member and the second bottom cover, wherein the bracket includes:
    a first protrusion protruding in a first direction from the first end of the first body portion;
    a second protrusion protruding in the first direction from the second end of the first body portion;

a third protrusion protruding in a second direction from the first end of the second body portion, wherein the second direction is opposite to the first direction;

a fourth protrusion protruding in the second direction from the second end of the second body portion;

a fifth protrusion located between the first and second protrusions, the fifth protrusion protruding from the first body portion in the first direction; and a sixth protrusion located between the third and fourth protrusions, the sixth protrusion protruding from the second body portion in the second direction, wherein the first protrusion contacts a first reflector of the first illumination unit, the second protrusion contacts the first bottom cover of the first illumination unit, the third protrusion contacts a second reflector of the second illumination unit, and the fourth protrusion contacts the second bottom cover of the second illumination unit.

17. The illumination unit according to claim 16, wherein a third distance is from the power source unit to the first body portion and a fourth distance is from the power source unit to the second body portion.

18. The illumination unit according to claim 17, wherein the third distance is different from the fourth distance.

19. The illumination unit according to claim 16, wherein a ratio of the first distance to the second distance of the bracket is in a range of 1:1.1 to 1:30.

20. The illumination unit according to claim 16, wherein the connecting portion has a first thickness, the first body portion has a second thickness, and the first thickness is greater than the second thickness, wherein a ratio of the first thickness to the second thickness is in a range of 1.01:1 to 5:1.

* * * * *